(12) United States Patent
Nomura

(10) Patent No.: US 7,463,976 B2
(45) Date of Patent: Dec. 9, 2008

(54) RECOMMENDED ROUTE CALCULATION METHOD AND NAVIGATION APPARATUS

(75) Inventor: Takashi Nomura, Kanagawa (JP)

(73) Assignee: Xanavi Informatics Corporation, Zama-shi (JP)

(*) Notice: Subject to any disclaimer, the term of this patent is extended or adjusted under 35 U.S.C. 154(b) by 651 days.

(21) Appl. No.: 10/832,417

(22) Filed: Apr. 27, 2004

(65) Prior Publication Data
US 2004/0215390 A1 Oct. 28, 2004

(30) Foreign Application Priority Data
Apr. 28, 2003 (JP) ............... 2003-124032

(51) Int. Cl.
*G01C 21/32* (2006.01)
(52) U.S. Cl. ............ 701/209; 701/211; 701/202; 340/995.27
(58) Field of Classification Search .......... 701/209, 701/211, 202; 340/995.27
See application file for complete search history.

(56) References Cited

U.S. PATENT DOCUMENTS

| | | | |
|---|---|---|---|
| 6,269,303 B1* | 7/2001 | Watanabe et al. | 701/209 |
| 6,701,248 B2* | 3/2004 | Petzold et al. | 701/202 |
| 2002/0128767 A1* | 9/2002 | Cardno et al. | 701/202 |
| 2003/0093217 A1* | 5/2003 | Petzold et al. | 701/201 |
| 2003/0225508 A9* | 12/2003 | Petzold et al. | 701/201 |
| 2005/0015197 A1* | 1/2005 | Ohtsuji et al. | 701/202 |

FOREIGN PATENT DOCUMENTS

| | | | |
|---|---|---|---|
| JP | 2-277200 A | | 11/1990 |
| JP | 7-146153 A | | 6/1995 |
| JP | 9-304098 A | | 11/1997 |
| JP | 2002-286478 A | | 10/2002 |
| JP | 2002-310695 A | | 10/2002 |

OTHER PUBLICATIONS

Notification of Reasons for Refusal (Summary) with English translation dated Mar. 4, 2008 (Four (4) Pages).

* cited by examiner

Primary Examiner—Khoi H. Tran
Assistant Examiner—Brian J Broadhead
(74) Attorney, Agent, or Firm—Crowell & Moring LLP

(57) ABSTRACT

A recommended route calculation method for calculating a recommended route from a current position to a destination based upon map data constituted of nodes and links, includes steps of: extracting attribute data of a link from data related to the links, the attribute data indicating characteristics of the link; judging whether or not the extracted attribute data of the link match attribute data having been input; and processing so that selectability of the link as a part of the recommended route is raised, when judging that the extracted attribute data of the link match the attribute data having been input.

9 Claims, 22 Drawing Sheets

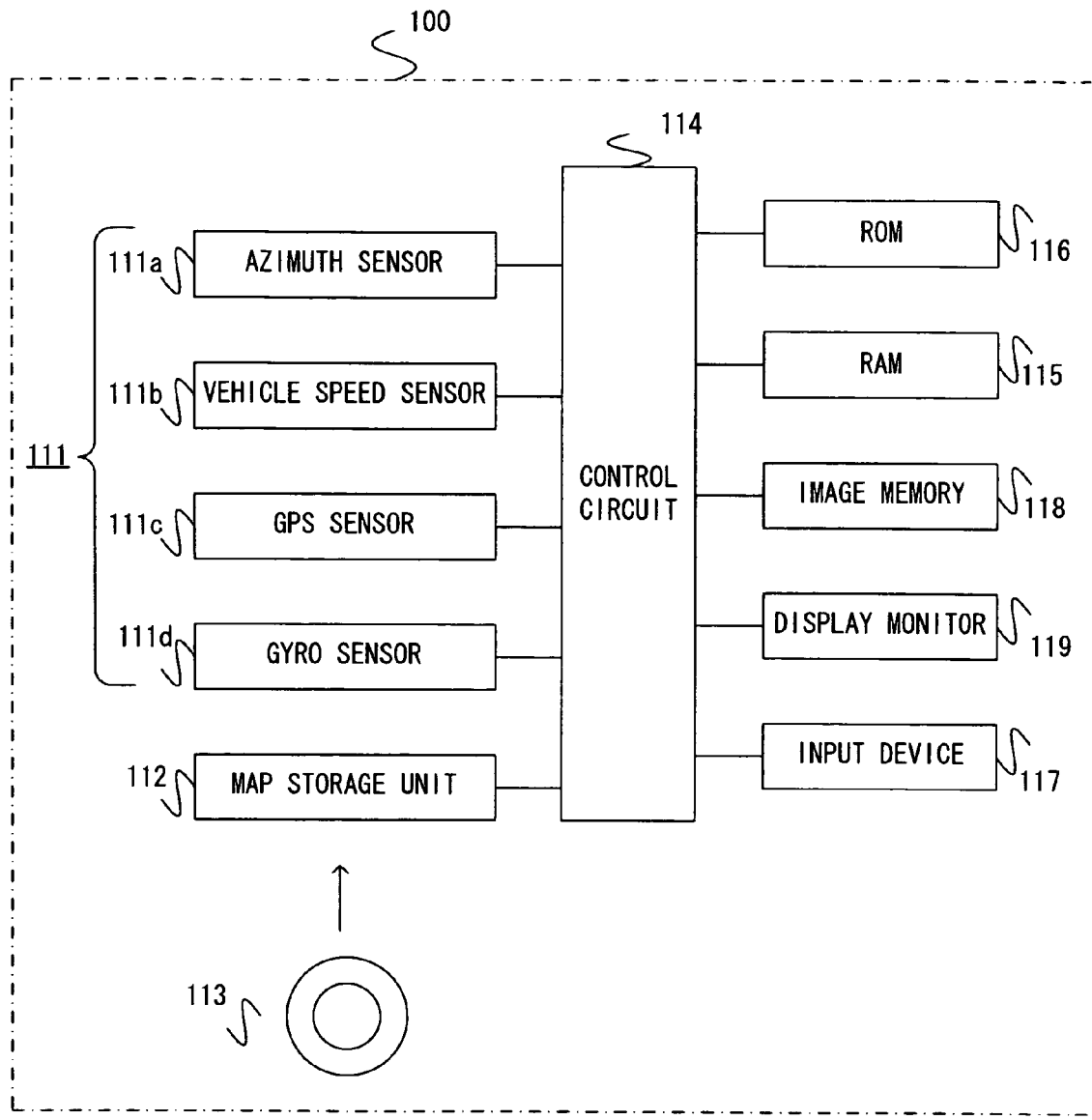

FIG. 5

CODE CORRESPONDENCE TABLE

| |
|---|
| ATTRIBUTE REFERENCE NAME #10 = ATTRIBUTE CODE #10 |
| ZONE REFERENCE NAME #11 = ATTRIBUTE CODE #11, COORDINATES #11 |
| ZONE REFERENCE NAME #12 = ATTRIBUTE CODE #12, COORDINATES #12 |
| ... |
| ZONE REFERENCE NAME #p = ATTRIBUTE CODE #p, COORDINATES #p |
| ATTRIBUTE REFERENCE NAME #20 = ATTRIBUTE CODE #20 |
| ZONE REFERENCE NAME #21 = ATTRIBUTE CODE #21, COORDINATES #21 |
| ZONE REFERENCE NAME #22 = ATTRIBUTE CODE #22, COORDINATES #22 |
| ... |
| ZONE REFERENCE NAME #r = ATTRIBUTE CODE #r, COORDINATES #r |
| ... |

"COASTAL ROAD" = 001Ah

"SHONAN BEACH" = 001Fh
X11 = *, Y11 = *

| ITEM NUMBER | bit | DETAILS | | | |
|---|---|---|---|---|---|
| 1 | 15~10 | (RESERVED) | | | |
| 3 | 9~8 | SIMPLE ATTRIBUTE CODE | bit9 | bit8 | MEANING |
| | | | 0 | 0 | ATTRIBUTE RELATED TO SCENIC VIEW |
| | | | 0 | 1 | ATTRIBUTE RELATED TO ACTIVITY (DINING, ETC.) |
| | | | 1 | 0 | (RESERVED) |
| | | | 1 | 1 | ATTRIBUTE NOT CLASSIFIED AS 00(2) OR 10(2) |
| 4 | 7~0 | ATTRIBUTE CODE | bit7~bit0 | | MEANING |
| | | | 00(16) | | UNDETERMINED OR UNKNOWN |
| | | | 01(16)~FC(16) | | GENERAL ATTRIBUTE |
| | | | FD(16) | | (UNUSED) |
| | | | FE(16) | | (UNUSED) |
| | | | FF(16) | | (UNUSED) |

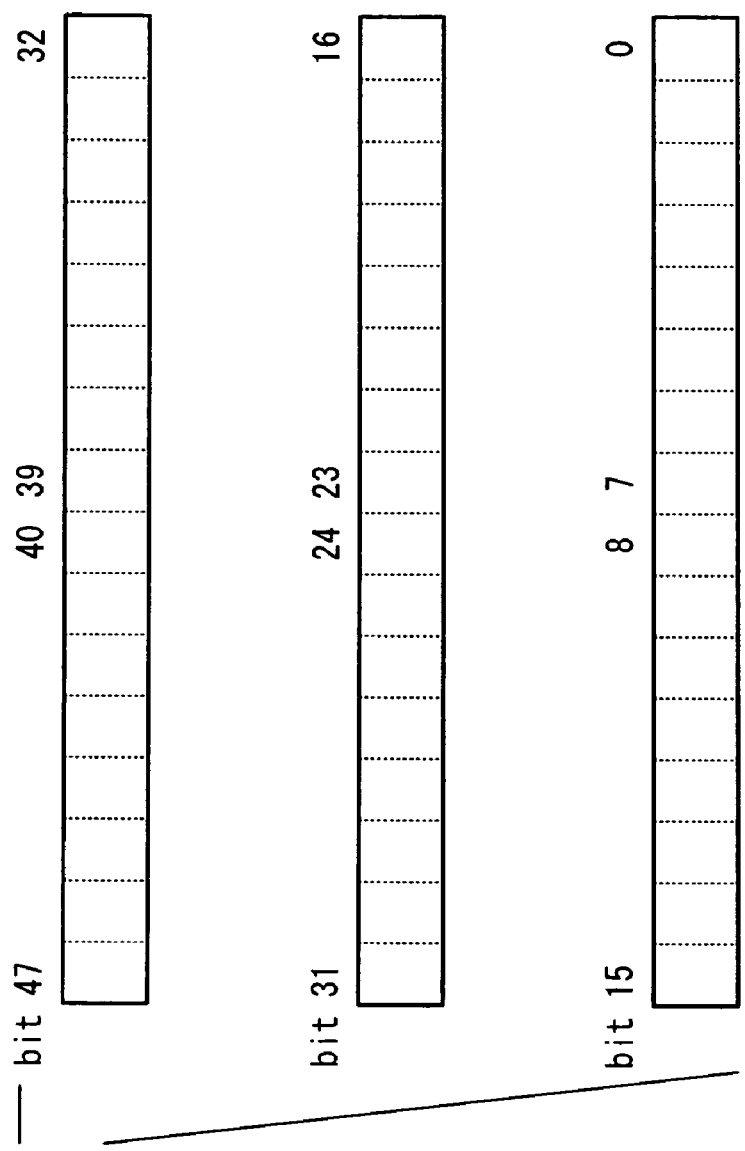

FIG. 15C

| ITEM NUMBER | bit | DETAILS | | | |
|---|---|---|---|---|---|
| 1 | 47 | MOUNTAIN ROAD | bit47 | MEANING | |
| | | | 0 | NON-MOUNTAIN ROAD | |
| | | | 1 | MOUNTAIN ROAD | |
| 2 | 46 | COASTAL ROAD | bit46 | MEANING | |
| | | | 0 | NON-COASTAL ROAD | |
| | | | 1 | COASTAL ROAD | |
| 3 | 45 | ROAD LINED WITH CHERRY TREES | bit45 | MEANING | |
| | | | 0 | NON-CHERRY TREE LINED ROAD | |
| | | | 1 | CHERRY TREE LINED ROAD | |
| 4 | ⋮ | ⋮ | | | |

RECOMMENDED ROUTE CALCULATION METHOD AND NAVIGATION APPARATUS

INCORPORATION BY REFERENCE

The disclosures of the following priority application are herein incorporated by reference:

Japanese Patent Application No. 2003-124032 filed Apr. 28, 2003.

BACKGROUND OF THE INVENTION

1. Field of the Invention

The present invention relates to a recommended route calculation method through which a recommended route from a start point to a destination is calculated and a navigation apparatus.

2. Description of the Related Art

There are so-called car navigation apparatuses known in the related art that calculate a recommended route from a start point through waypoints to a destination and provide route guidance based upon the calculated recommended route. The waypoint and the destination used in the recommended route calculation in such a car navigation apparatus in the related art are specific geographic points such as intersections, facilities, etc., specified by the user.

SUMMARY OF THE INVENTION

The user of a car navigation apparatus in the related art wishing to travel from Tokyo to Hakone through a road lined with cherry trees, for instance, needs to enter in advance a waypoint where a road lined with cherry trees are present. Thus, if the user does not know the exact location of the road lined with cherry trees, he cannot set a road lined with cherry trees as a waypoint.

According to a first aspect of the invention, a recommended route calculation method for calculating a recommended route from a current position to a destination, comprises: displaying a list of roads sorted based upon an attribute of road; identifying a road specified by a user among the displayed roads; setting a predetermined point of the identified road as a waypoint; and calculating a recommended route from a current position to a destination via the set waypoint.

According to a second aspect of the invention, a recommended route calculation method for calculating a recommended route from a current position to a destination, comprises: displaying a list of roads sorted based upon an attribute of road; identifying a road specified by a user among the displayed roads; and processing so that selectability of a link, an attribute of which matches an attribute of the identified road, is raised when calculating a recommended route from a current position to a destination.

According to a third aspect of the invention, a recommended route calculation method for calculating a recommended route from a current position to a destination based upon map data constituted of nodes and links, comprises steps of: extracting attribute data of a link from data related to the links, the attribute data indicating characteristics of the link; judging whether or not the extracted attribute data of the link match attribute data having been input; and processing so that selectability of the link as a part of the recommended route is raised, when judging that the extracted attribute data of the link match the attribute data having been input.

According to a fourth aspect of the invention, it is preferred that a recommended route calculation method according to the third aspect, further comprises steps of: selecting a range determined in correspondence to the start point and the destination; determining links contained in the range; extracting attribute data included in the determined links; bringing up a display of the extracted attribute data included in the determined links at a display device, and the attribute data having been input is attribute data having been input based upon the display.

According to a fifth aspect of the invention, in a recommended route calculation method according to the fourth aspect, it is preferred that: the extracted attribute data to be displayed at the display device are sorted in correspondence to the characteristics of the individual determined links.

According to a sixth aspect of the invention, in a recommended route calculation method according to any one of the third through fifth aspects, it is preferred that: a link cost of a link with the attribute data matching the input attribute data is reduced through the processing.

According to a seventh aspect of the invention, in a recommended route calculation method according to any one of the third through sixth aspects, it is preferred that: when displaying the calculated recommended route, a part of the recommended route corresponding to the link with the attribute data matching the input attribute data is displayed in a display mode different from a display mode adopted to display the rest of the recommended route.

According to a eighth aspect of the invention, in a recommended route calculation method according to the seventh aspect, it is preferred that: when displaying the calculated recommended route at the display device, the part of the recommended route corresponding to the link with the attribute data matching the input attribute data is displayed together with a mark indicating the meaning of the input attribute data.

According to a ninth aspect of the invention, in a recommended route calculation method according to the eighth aspect, it is preferred that: the mark is an icon adopting a display mode corresponding to a type of attribute data.

According to a tenth aspect of the invention, a navigation apparatus, comprises: a control device executing a recommended route calculation method according to any one of the first through ninth aspects.

BRIEF DESCRIPTION OF THE DRAWINGS

FIG. 1 shows a system block diagram of the structure adopted in the car navigation apparatus in the first embodiment

FIG. 5 shows the structure of the code correspondence table used in the car navigation apparatus in FIG. 1

FIGS. 15A through 15C show the structure of the attribute code data portion used in the second embodiment

DESCRIPTION OF THE PREFERRED EMBODIMENTS

First Embodiment

Figure 2A:
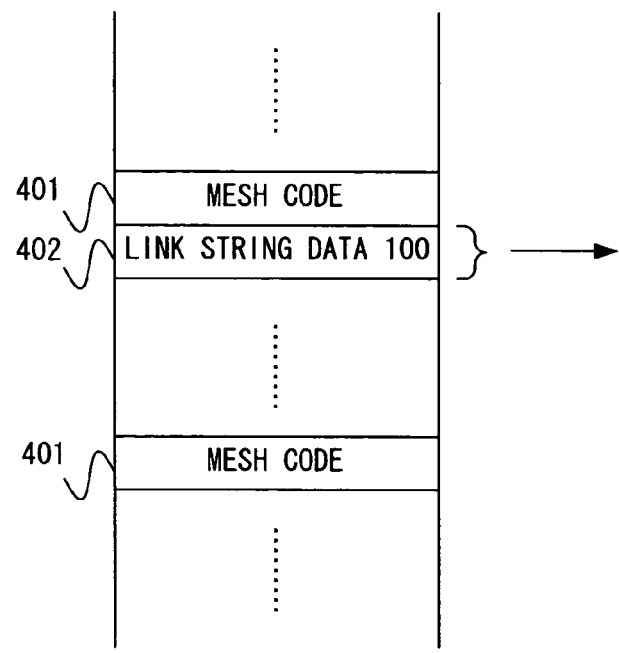
FIGS. 2A and 2B show the data structure of the display map data used in the car navigation apparatus in FIG. 1

The first embodiment, in which the navigation apparatus according to the present invention is utilized as an on-vehicle system, is explained in reference to FIGS. 1 to 12. FIG. 1 is a system block diagram of the structure adopted in the car navigation apparatus (hereafter referred to as an on-vehicle apparatus 100) in the first embodiment. The on-vehicle apparatus 100, having a function of displaying a road map of an area around the current vehicle position, a function of calculating a recommended route from a start point to a destination, a function of providing route guidance based upon the calculated recommended route and the like, performs so-called navigation, road guidance and the like.

Reference numeral 111 in FIG. 1 indicates a current point detection device that detects the current position of the vehicle and is constituted of, for instance, an azimuth sensor 111a that detects the advancing azimuth of the vehicle, a vehicle speed sensor 111b that detects the vehicle speed a GPS sensor 111c that detects a GPS signal transmitted from a GPS satellite, a gyro sensor 111d that detects a change in the advancing direction of the vehicle and the like. Reference numeral 112 indicates a map storage unit at which various types of data including map display data and route search data to be detailed later are stored, and the various types of data are read from a DVD ROM 113, which is a recording medium. Any of various types of recording media including magnetic tape, a CD ROM and a hard disk may be used as the recording medium instead of a DVD ROM. A control circuit indicated by reference numeral 114, which controls the entire apparatus, is constituted of a microprocessor and its peripheral circuits. The control circuit 114, which uses a RAM 115 as a work area, implements various types of control to be detailed later by executing a control program stored in a ROM 116.

Reference numeral 117 indicates an input device having switches used to enter a vehicle destination, a waypoint and the like or to input various types of operations. The input device 117 includes a microphone and thus enables the user to input the various operations and the destination by voice. Reference numeral 118 indicates an image memory in which image data to be displayed at a display monitor 119 are stored, and the image data are generated by using road map drawing data and various types of graphic data. The image data stored in the image memory 118 are read out as necessary and are displayed at the display monitor 119 constituting a means for display. Route information, guidance information and the like are displayed at the display monitor 119 together with the road map.

The car navigation apparatus (on-vehicle apparatus) 100 adopting the structure described above executes various types of navigation operations based upon vehicle position information obtained from the current point detection device 111 and map information stored in the map storage unit 112. For instance, it displays the road map of the area around the vehicle position and the current vehicle position itself at the display monitor 119 and guides the driver along the route obtained through a route search. As detailed later, the on-vehicle apparatus 100 according to the present invention is capable of providing route guidance so as to guide the vehicle to the destination through a road satisfying a specified requirement.

-Data Structure-

In the first embodiment, the map display data and the route search data (together referred to as map data) are divided into a plurality of levels (hierarchical layers) each corresponding to one of different scaling factors. The individual hierarchical layers contain map data corresponding to the varying scaling factors of a given area. Namely, if the car navigation apparatus supports, for instance, the entire area of Japan, map data of the entire nation of Japan corresponding to various scaling factors are contained in the individual hierarchical layers. In other words, the number of sets of map data each corresponding to one of the hierarchical layers matches the number of hierarchical layers. In the first embodiment, the map data in each hierarchical layer adopt the following data structure.

Figure 2B:
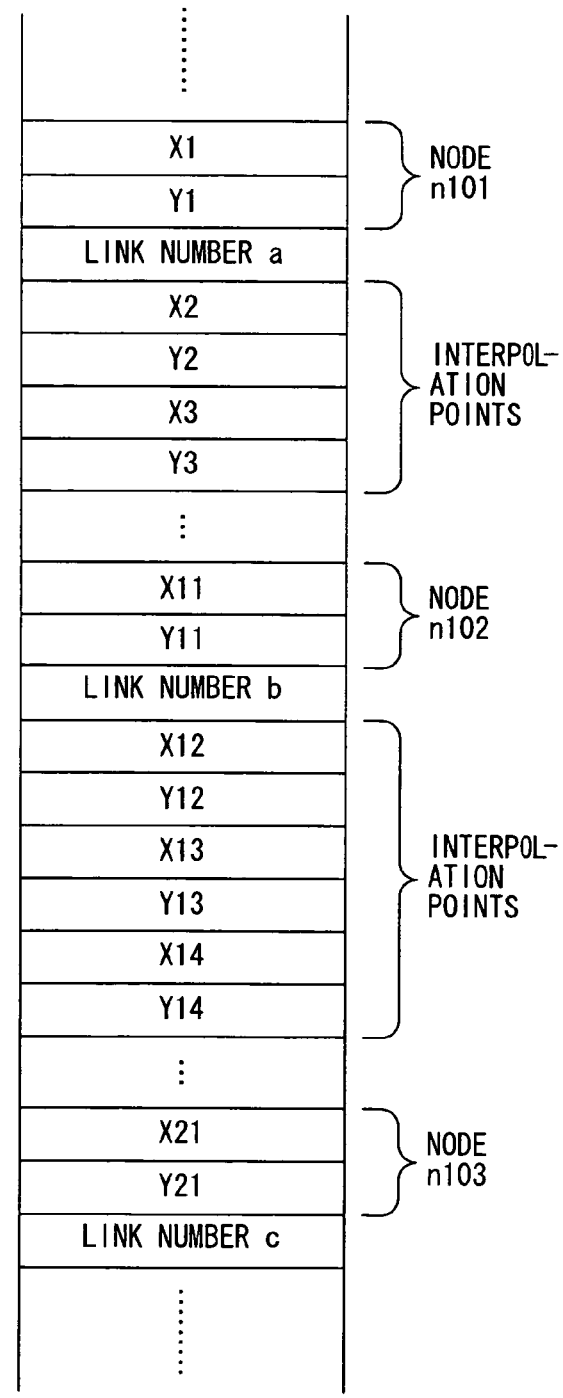

FIGS. 2A and 2B show the structure of the map display data (road data). As the road data, link string data are grouped in units of individual mesh areas and are stored together with the corresponding mesh codes. It is to be noted that the term "link string data" is used to refer to data adopting a structure in which a given road is defined by nodes such as intersection points and links connecting the nodes. A mesh area refers to one of the a real portions ranging over a predetermined area into which the road map is divided. In a mesh code storage area 401, a number used to identify the corresponding mesh area is stored. In a link string data storage area 402, positional coordinates Xn and Yn of nodes, numbers assigned to links connecting the nodes and positional coordinates Xn and Yn of interpolation points which further divide the links into shorter segments are stored in assigned areas, as shown in FIG. 2B. These positional coordinates are used as contour data in map display processing and locator processing.

Figure 3:
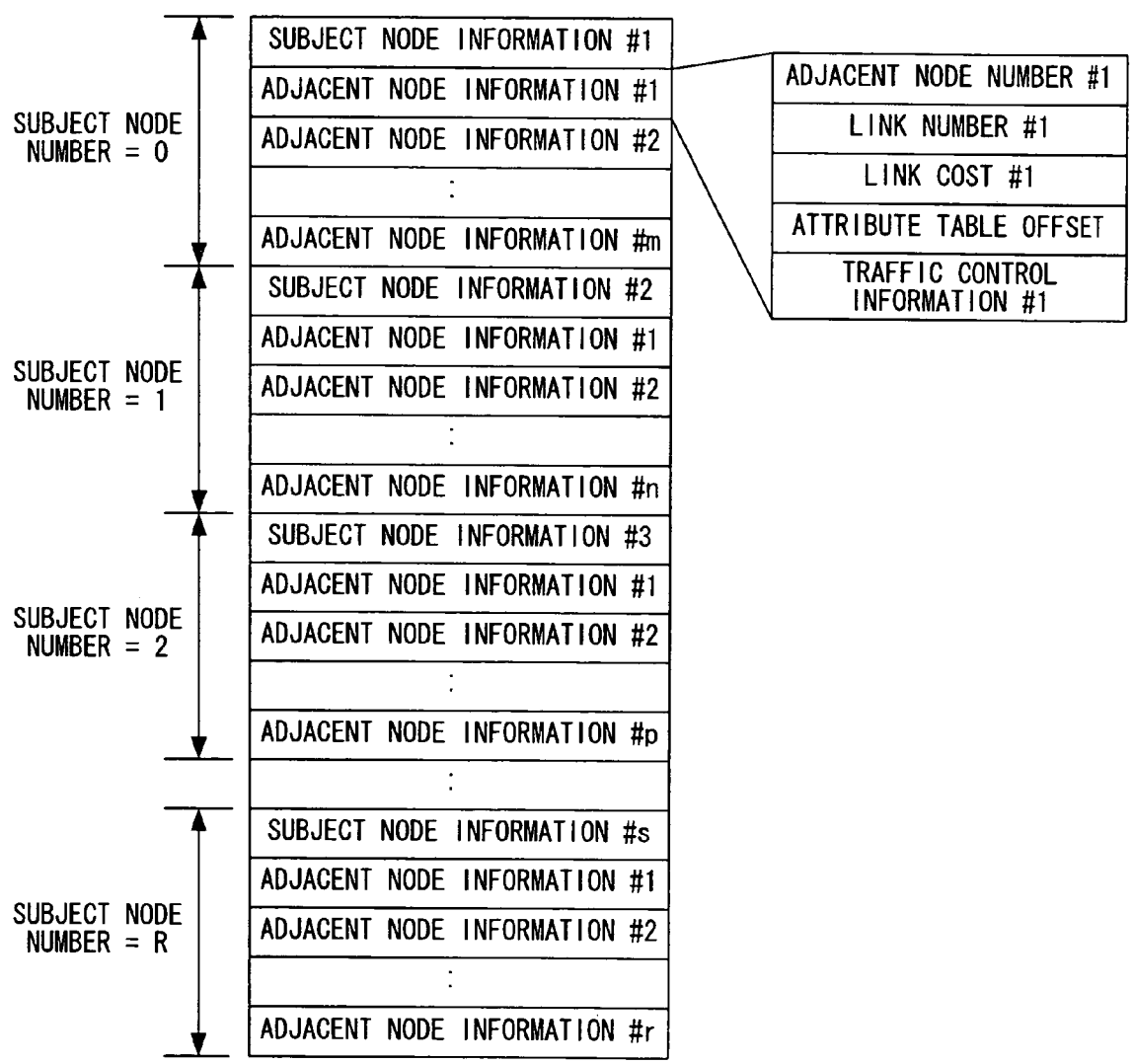
FIG. 3 shows the data structure of the route search data used in the car navigation apparatus in FIG. 1

FIG. 3 shows the data structure of the route search data. Unlike the road data, the route search data are constituted of branching point information and intersection point information which do not bear a direct relation to the road contour. As shown in FIG. 3, node information indicating the connecting relation with another node is stored for each connecting point (node) of a link that is the smallest unit used to express a road. Each set of node information is constituted of subject (or home) node information related to a given node itself and adjacent node information related to any adjacent node that is present next to the subject node via a single link, with the positional coordinates of the subject node stored in the subject node information. As shown in the figure, each set of adjacent node information contains an adjacent node number assigned to the adjacent node, a link number assigned to the link connecting the subject node and the adjacent node, the link cost of the link, an attribute table offset and traffic control information related to the link. In addition, the individual sets of node information are stored in the order corresponding to the link connection order so that the node number of a given subject node can be ascertained in conformance to the order in which the corresponding node information is stored.

Figure 4:
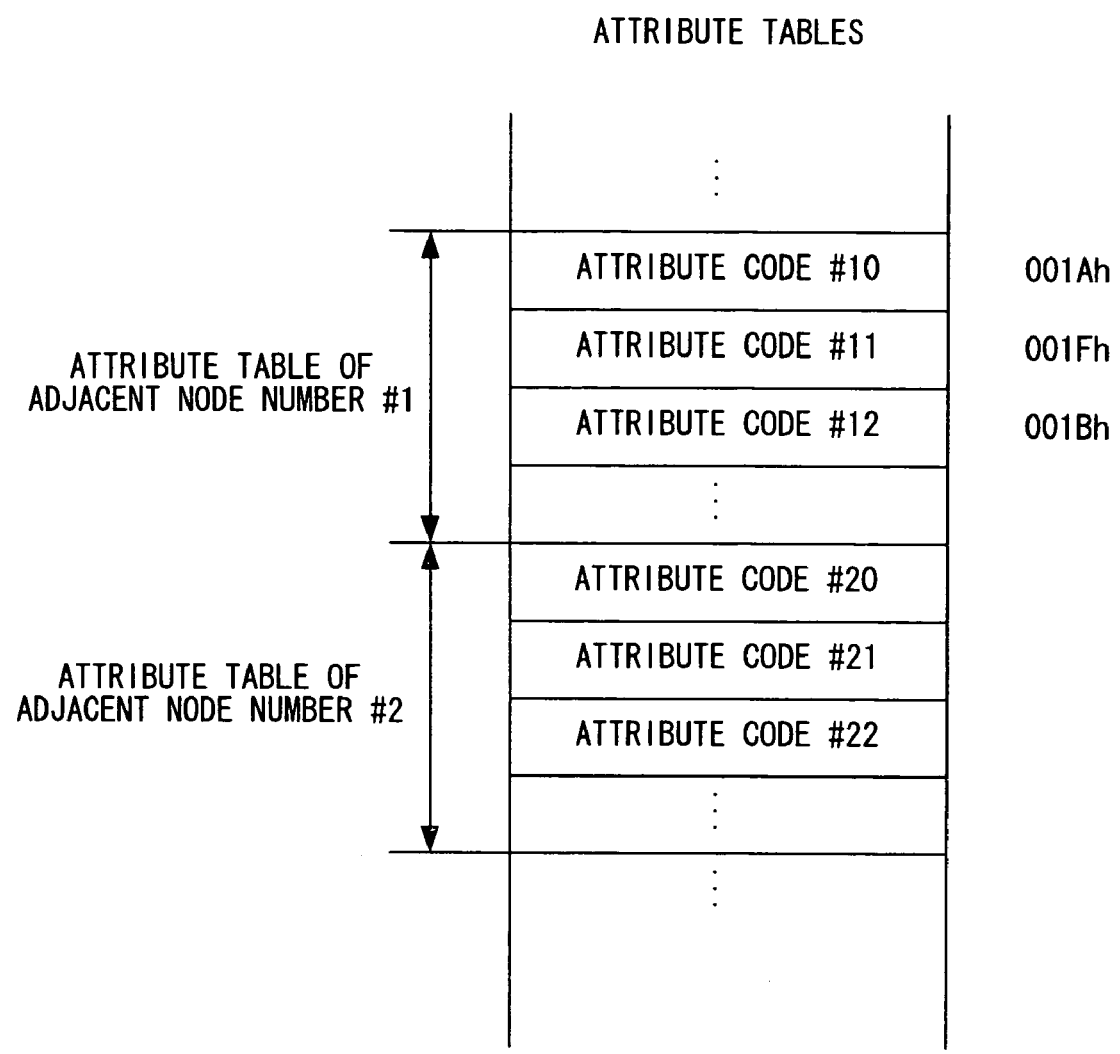
FIG. 4 shows the structure of the attribute tables used in the car navigation apparatus in FIG. 1

FIG. 4 shows the structure of the attribute tables. In each attribute table, link attribute codes are written for the corresponding link as data indicating the characteristics of the link. The attribute codes include a code indicating characteristics (attributes) of the link, e.g., "coastal road", "mountain road" or "road lined with cherry trees", and codes assigned to zone names such as Shonan Beach, Miura Beach, Hakone Yumoto, Tonosawa, Chidorigafuchi or Tanzawa. For instance, if the attribute table with the adjacent node #1 in FIG. 4 holds information related to National Road No. 134 extending from Kamakura City in Kanagawa Prefecture to a point near Fujisawa City in Kanagawa Prefecture, a attribute code #10 (hexadecimal 001Ah) indicating "coastal road" and an attribute code #11 (hexadecimal 001Fh) indicating Shonan Beach are stored. It is to be noted that a code indicating a link attribute, e.g., "coastal road", may be referred to as a primary (or parent) attribute code, and a code assigned to a zone name, e.g., Shonan Beach, may also be referred to as a secondary (or child) attribute code. It is to be noted that an attribute table corresponding to an adjacent node among the attribute tables can be accessed by using an attribute offset value to the attribute table in the adjacent node information shown in FIG. 3.

FIG. 5 shows the structure of a code correspondence cable. The code correspondence table indicates the correspondence of the attribute reference names (text data) of the attributes indicating link characteristics (attributes) such as "coastal road", "mountain road" and "road lined with cherry trees" and the zone reference names (text data) such as Shonan Beach, Miura Beach and Hakone Yumoto to the attribute codes shown in FIG. 4. In correspondence to a given zone reference name, the attribute code indicating the zone and the coordinates of a point representing the zone name are stored. For instance, the reference name text data "coastal road" and the attribute code #10 (001Ah) assigned to "coastal road" are stored for attribute reference name #10, whereas the reference name text data "Shonan Beach", the attribute code #11 (001Fh) assigned to "Shonan Beach" and the coordinates X 11 and Y 11 of the point representing "Shonan Beach" are stored for zone reference name #11.

-Route Search-

The route search calculation is executed by using the route search data described above. Route guidance data, which result from the route search, are created by extracting the nodes, which are present on the recommended route from the start point to the destination, from the route search data through a method of the known art. The route guidance data include guidance point data. The guidance point data include geographic point data related to points at which guidance needs to be provided and offset data of enlarged maps around intersection points and audio data. While guiding the vehicle through the route, the car navigation apparatus displays an intersection point enlarged map on the display monitor and outputs audio data through the speaker so as to provide the driver with route guidance, by referencing the offset data, as the vehicle reaches a point several hundred meters from a guidance point.

Figure 6:
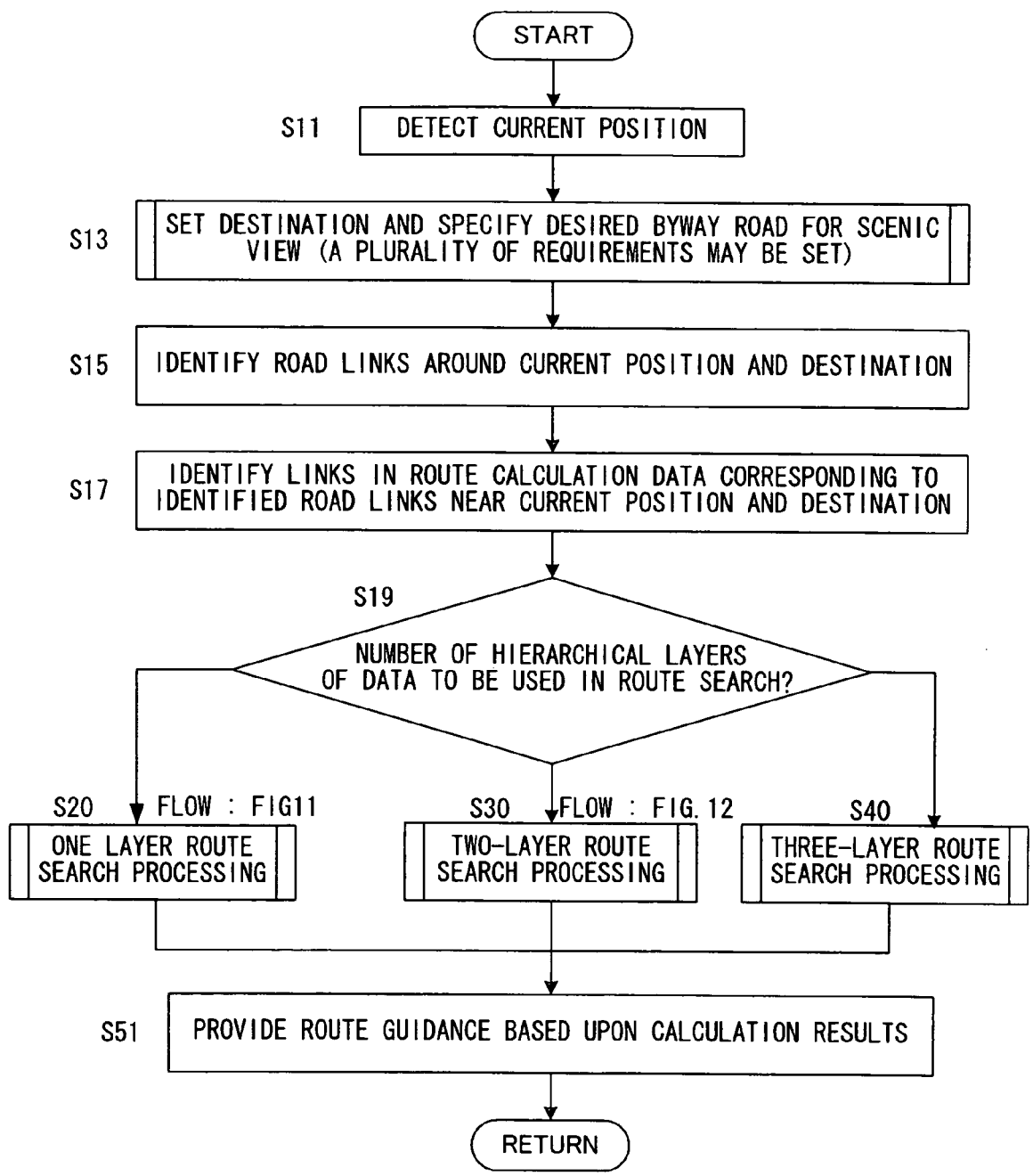
FIG. 6 shows a flowchart of the operation of the car navigation apparatus in FIG. 1

FIG. 6 presents a flowchart of the operation executed by the on-vehicle apparatus 100 in the first embodiment. As the ignition key is turned to enter an accessory ON (ACC ON) state, the power to the on-vehicle apparatus 100 is turned on and a program for executing the navigation processing shown in FIG. 6 is started up. In step S11, the current position of the vehicle is detected and a vehicle position mark (current vehicle position mark) is displayed together with a map of an area around the vehicle position at the display monitor 119. In the subroutine executed in step S13, a destination and a waypoint are set as the destination and the waypoint or the road the user wishes to travel on for its scenic new (hereafter referred to as a scenic byway road) which are input through switch operations or with voice instructions issued through the microphone. The user (driver) is allowed to specify a plurality of requirements for a scenic byway road.

In step S15, one or a plurality of road links near the vehicle current position detected in step S11 and the destination entered in step S13 are identified based upon the road data. After the road links near the current position and the destination are identified in step S15, the operation proceeds to step S17 to determine the corresponding subject nodes and then to specify the link to any node adjacent to each subject node based upon the adjacent node and the subject node, before proceeding to step S19.

In step S19, a decision is made as to the number of hierarchical layers over which the route search processing is to be executed. Namely, based upon the distance between the current position and the destination, a decision is made as to how many hierarchical layers of route search data corresponding to varying scaling factors are to be used in the route search processing. If the destination is close to the current position (within a predetermined distance), one-layer route search processing is executed, whereas two-layer route search processing or three-layer route search processing is executed if the distance between the current position and the destination is significant.

In the route search, the route search data at the lowermost level (the most detailed data) are normally used in the vicinity of the current position and the destination. Accordingly, if the current position and the destination are close to each other, the route search data at the lowermost level are used for the entire route search. If, on the other hand, the distance between the current position and the destination is significant, route search data at an upper level (on a wider range side) are used to search for the intermediate route so as to reduce the length of time required for the route search. Thus, the route search data at the lowermost level are used around the current position and the destination and the route search data at the higher level are used in the intermediate route search in such a case. Namely, the two-layer route search processing or the three-layer route search processing is executed.

Figure 7:
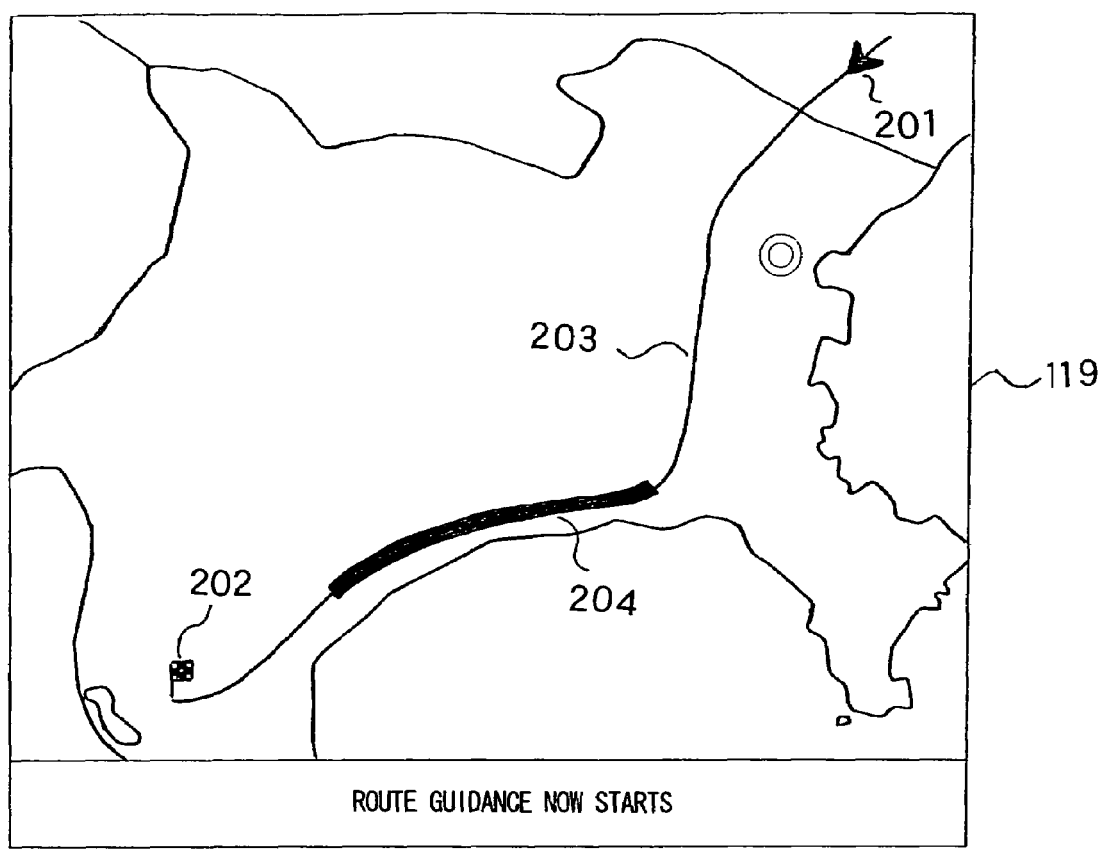
FIG. 7 shows a recommended route displayed at the display monitor 119

If it is decided in step S19 that the one-layer route search processing is to be executed, the operation proceeds to step S20. If, on the other hand, it is decided that the two-layer route search processing is to be executed, the operation proceeds to step S30 and if it is decided that the three-layer route search processing is to be executed, the operation proceeds to step S40. After executing the route search subroutine in step S20, step S30 or step S40, the operation proceeds to step S51 to start route guidance by displaying the recommended route resulting from the calculation executed in the route search subroutine in step S20, step S30 or step S40. At this time, the scenic byway road set by the driver in step S13 within the recommended route is displayed at the display monitor 119 in a display mode different from the display mode adopted for the rest of the recommended route, as shown in FIG. 7. Namely, the scenic byway road is displayed with a display line or a display color different from that used for the rest of the recommended route. FIG. 7 shows the results of the route search calculation executed by setting a start point (vehicle position) 201 at Kasumigaseki in Chiyoda Ward, Tokyo, a destination 202 at Hakone Yumoto in Hakone Kanagawa Prefecture and Shonan Beach as a scenic byway road. A scenic byway road display 204 of National Road No. 134 near Shonan Beach, which is set as the scenic byway road, uses a display color different from the display color used for a recommended route display 204 for the remaining recommended route and is also indicated with a bolder line for emphasis.

Figure 8:
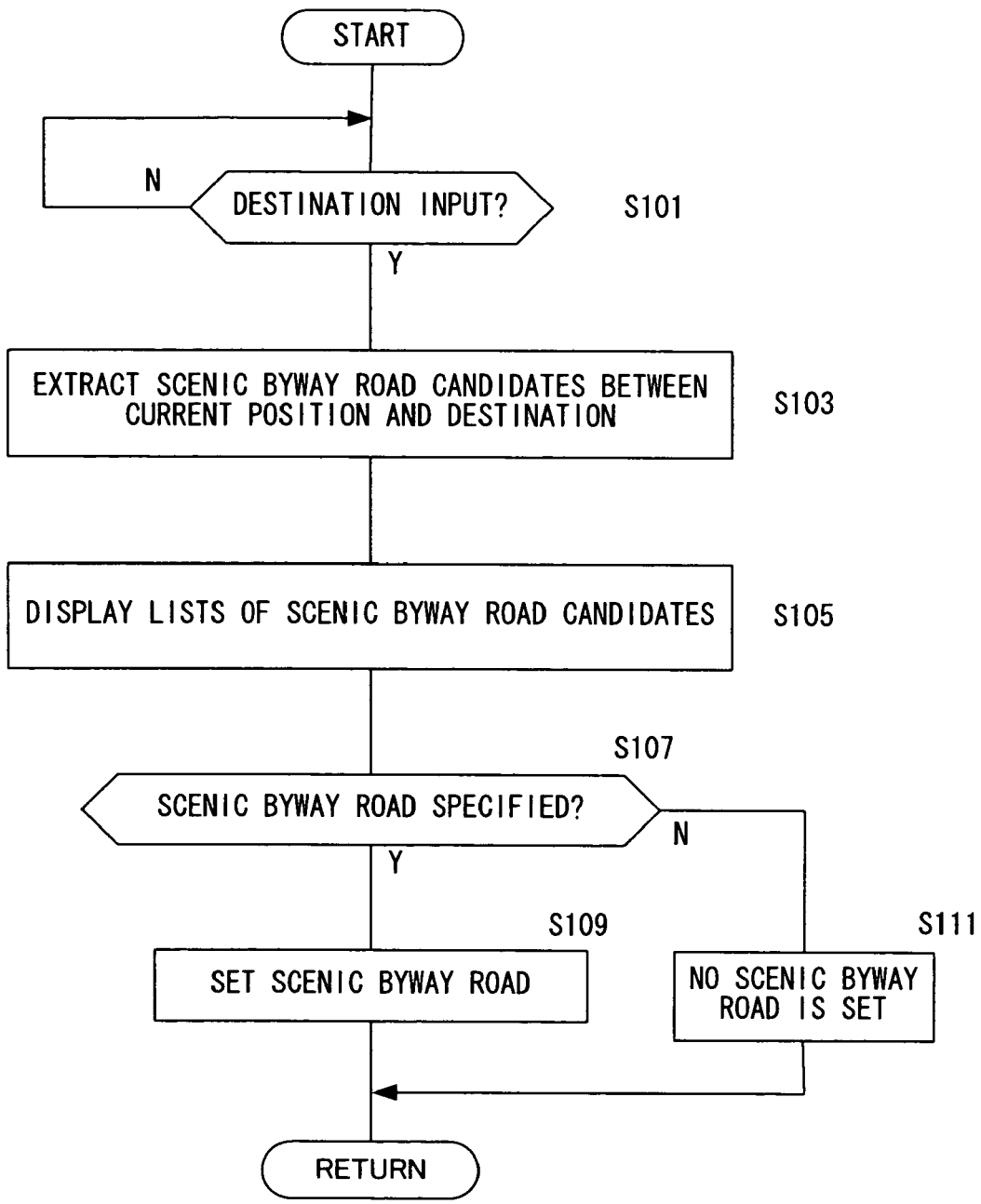
FIG. 8 shows a flowchart of part of the subroutine executed in step S13 in the flowchart presented in FIG. 6
Figure 9:
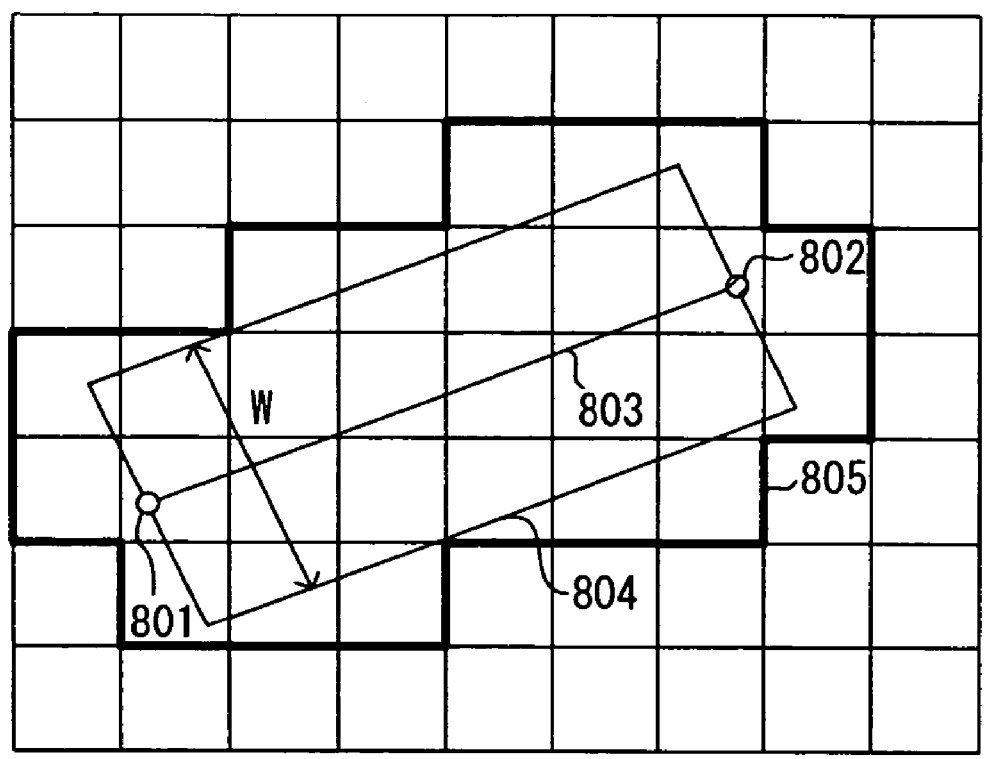
FIG. 9 shows an area 804 from which scenic byway road candidates between the current position and the destination are to be extracted

FIG. 8 shows part of the subroutine executed in step S13 in FIG. 6. Namely, FIG. 8 presents a flowchart of the operation of a program which enables a driver selection by displaying lists of scenic byway road candidates sorted in correspondence to individual attribute reference names at the display monitor 119 so as to allow the driver to select a desirable scenic byway road. In step S101, the operation waits in standby until the destination is entered. Once the destination is entered, the operation proceeds to step S103 to extract the scenic byway road candidates present between the current position and the destination in correspondence to individual attribute codes. The specific processing executed in step S103 is now described. As shown in FIG. 9, an area 804 ranging from a straight line 803, which connects the current position 801 and the destination 802, along opposite directions so as to achieve a predetermined width W is selected. Then, the attribute codes and the zone reference names stored together with the corresponding coordinate values, which are contained in the area 804 shown in FIG. 9, are searched, and the zone reference names are extracted in correspondence to the individual attribute reference names. In addition, the attribute code and the zone reference names stored together with the corresponding coordinate values, which are contained in a wider area 805 that includes all the meshes including the area 804 in FIG. 9, maybe searched and the zone reference names maybe extracted in correspondence to the individual attribute reference names.

Figure 10:
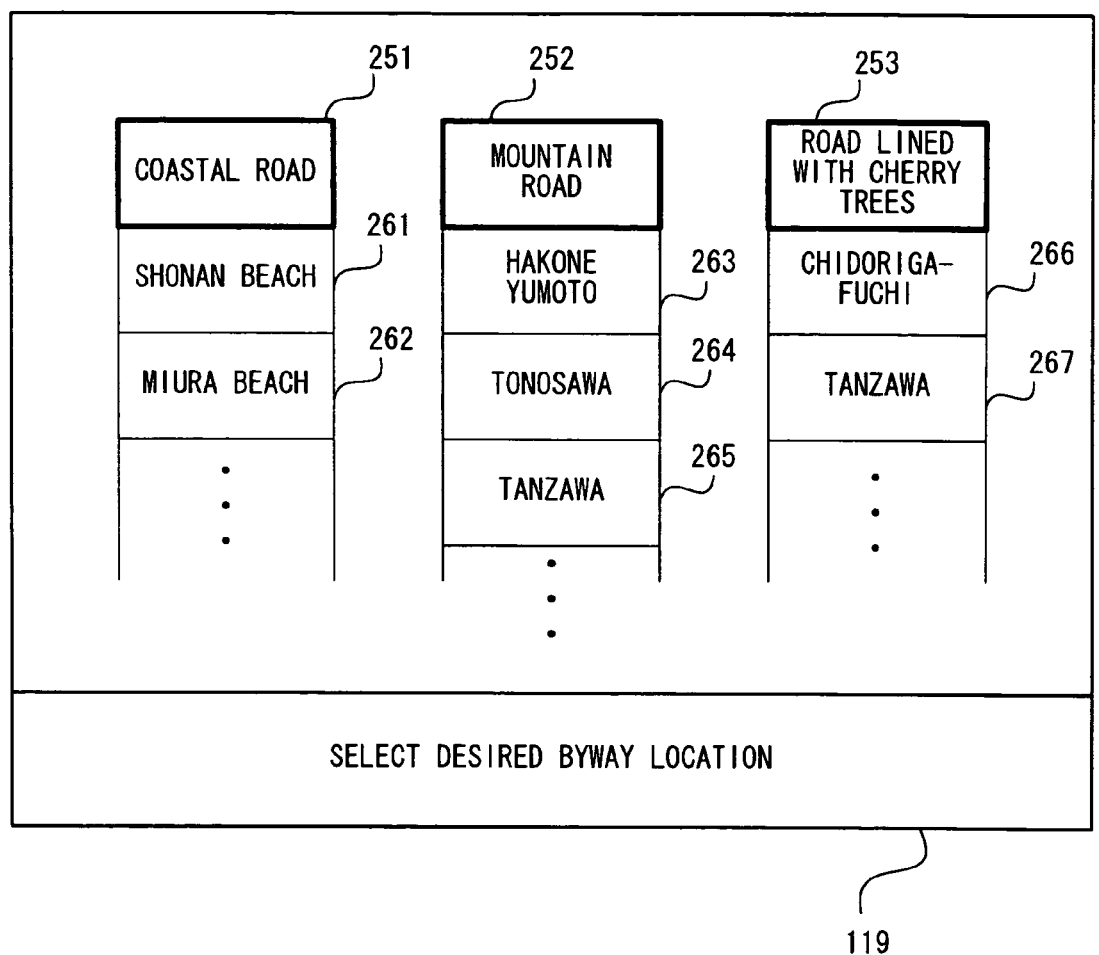
FIG. 10 shows scenic byway road candidates displayed at the display monitor 119

In step S105, the scenic byway road candidates extracted in step S103 are displayed at the display monitor 119. As shown in FIG. 10, lists of zone reference names 261 to 267 corresponding to specific secondary attribute codes such as Shonan Beach and Hakone Yumoto are displayed, each in correspondence to one of the characteristics (attributes) 251 to 253 corresponding to specific primary attribute codes such as "coastal road" and "mountain road", as the scenic byway candidates. Once the processing in step S105 is executed, the operation proceeds to step S107 to make a decision as to whether or not a scenic byway road has been selected from among the scenic byway road candidates displayed in S105. It is to be noted that when the decision is made in step S107, more than one scenic byway road may have been set. If an affirmative decision is made in step S107, the operation proceeds to step S109 to set the scenic byway road(s) before the subroutine ends. If, on the other hand, a negative decision is made in step S107, the operation proceeds to step S111 to end the subroutine without setting in any scenic byway road. In setting of the scenic byway road, the attribute code corresponding to the specified scenic byway road is stored in a volatile memory (not shown).

Figure 11:
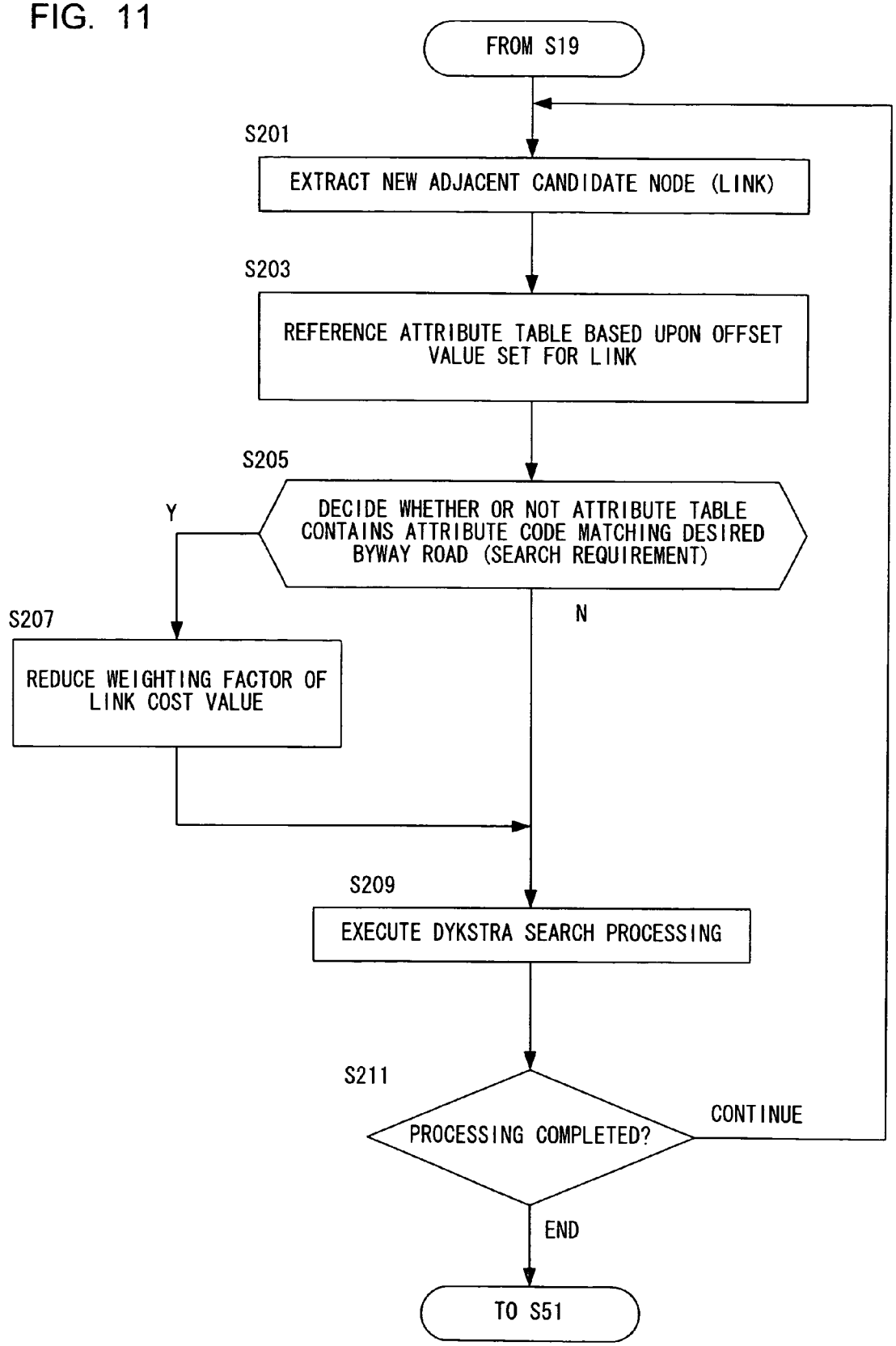
FIG. 11 shows a flowchart of the subroutine executed in step S20 in the flowchart presented in FIG. 6

FIG. 11 presents a flowchart of the subroutine executed in step S20. In step S201, a new adjacent candidate node is extracted. In this step, an adjacent candidate link, instead, may be extracted. In step S203, the corresponding attribute table shown in FIG. 4 is referenced based upon the offset value set for the node extracted in step S201. In step S205, a decision is made as to whether or not any of the attribute codes of the scenic byway road set in the subroutine executed in step S13 is included in the attribute table referenced in step S203.

If an affirmative decision is made in step S205, the operation proceeds to step S207 to reduce the weighting of the link cost value of the link at a predetermined rate. Namely, the link cost value is reduced to raise the selectability of the link in the route search calculation. It is to be noted that the level of selectability of the link in the route search calculation is determined in conformance to the rate at which the weighting factor of the link cost value is reduced. In addition, the weighting factor of the link cost of a link holding two or more attribute codes having been set may be further reduced when a plurality of scenic byway roads have been set. In other words, the selectability of the link in the route search calculation may be further increased as the link satisfies the requirements having been set to a higher extent.

After executing the processing in step S207 or after making a negative decision in step S205, the operation proceeds to step S209. In step S209, a route search calculation is executed for the link by adopting a Dykstra method of the known art, and then the operation proceeds to step S211. In step S211, a decision is made as to whether or not the route search processing has been completed, i.e. , whether or not the route obtained through the route search processing in step S209 has reached the destination. If an affirmative decision is made in step S211, the subroutine ends and the operation returns to step S51 in the main routine. If, on the other hand, a negative decision is made in step S211, the operation returns to step S201.

Figure 12:
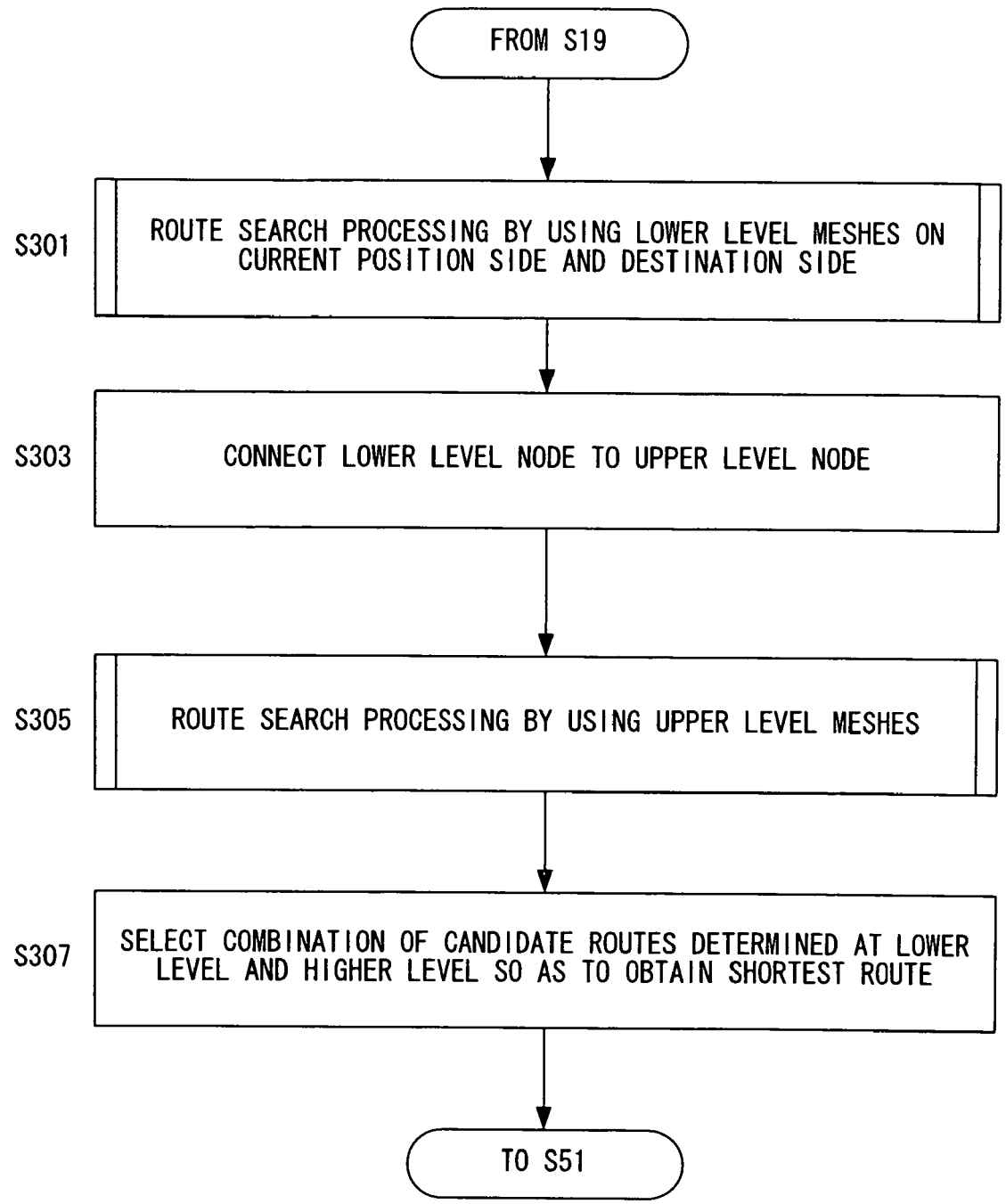
FIG. 12 shows a flowchart of the subroutine executed in step S30 in the flowchart presented in FIG. 6.

FIG. 12 presents a flowchart of the two-layer route search processing. In step S301, route search processing is executed by using meshes at the low level on the current position side and the destination side. This processing is identical to the one layer route search processing in FIG. 11. In step S303, processing for connecting nodes at the lower level and the upper level is executed. In this processing, a new upper layer candidate node is extracted by using a level correspondence table (not shown). In the level correspondence table, which is provided at the upper layer (the wider range), information indicating the correspondence of each of the nodes at the upper level to a specific node in a specific mesh at the lower level (the more detailed) is stored. Once the processing for connecting the nodes at the lower level and the upper level executed in step S303 is completed, the operation proceeds to step S305.

In step S305, route search processing is executed by using the meshes at the upper level. Since the processing in step S305 is similar to the one layer route search processing in FIG. 11, its explanation is omitted. In step S307, the combination of a candidate route calculated at the lower level and a candidate route calculated the upper level that will achieve the shortest route is determined, and then the operation returns to step S51 in the main routine.

Since the subroutine of the three-later route search processing executed in step S40 in the main routine in FIG. 6 is similar to the two-layer route search processing in FIG. 12 explained above, its explanation is omitted.

When the vehicle is currently located at Kasumigaseki in Chiyoda Ward, Tokyo and the destination set for the route search is Hakone Yumoto in Hakone, Kanagawa Prefecture, the on-vehicle apparatus 100 achieved in the first embodiment provides route guidance as follows. As a given geographic point near Hakone Yumoto is entered to set the destination in step S13 in FIG. 6, the area 804 in FIG. 9 is selected.

Then, the attribute codes and the zone reference names stored together with the corresponding coordinate values, which are contained in the area 804, are searched by using the code correspondence table shown in FIG. 5 and the zone reference names are extracted in correspondence to the individual attribute reference names (step S103). Then, the lists of the extracted reference names are displayed at the display monitor 119 (step S105). As the driver designates "Shonan Beach" by operating various operating switches at the input device 117, the attribute code corresponding to the zone reference name "Shonan Beach" is set as a scenic byway road. In the route search calculation, the route achieving the smallest sum of the link cost values of links to the individual nodes is selected as the shortest route, i.e. , the recommended route, through the Dykstra method of the known art.

In the embodiment, when calculating the accumulated value of the link costs during the route search calculation, attribute tables (see FIG. 4) are each referenced based upon the offset (see FIG. 3) to the corresponding attribute table stored in the adjacent node information of a given adjacent candidate node. During this process, if the attribute table being referenced holds the attribute code corresponding to the zone reference name "Shonan Beach", the link cost value of the candidate node is reduced. Namely, by lowering the link costs over the entire scenic byway road with the zone reference name "Shonan Beach", the likelihood of the entire scenic byway road having been set being selected as the recommended route is raised.

Through the route search calculation executed as described above, National Road No. 134 near Shonan Beach is included in the recommended route as a scenic byway road with the zone reference name "Shonan Beach". Then, the recommended route 203 through which the vehicle is to be guided from Kasumigaseki to Hakone Yumoto through National Road No. 134 near Shonan Beach is brought up on display at the display monitor 119 as shown in FIG. 7, and the route guidance starts. At the display monitor 119, a scenic byway road 204 indicating National Road No. 134 near Shonan Beach having been set as the scenic byway road is displayed by using a display color different from the color used to display the rest of the recommended route 203 with a bolder line.

The following advantages are achieved with the on-vehicle apparatus 100 in the first embodiment.

(1) After a destination is entered, lists of scenic byway road candidates sorted in correspondence to different attribute reference names are displayed at the display monitor 119. This enables the user to select a scenic byway road from the lists of various scenic byway road candidates sorted in correspondence to specific characteristics, which are displayed at the display monitor 119, even when the user is traveling through an area he is not familiar with. Then, the user can select a desired geographic point (e.g., ideal for cherry blossom viewing) as a waypoint simply by selecting a specific attribute reference name (e.g., "road lined with cherry trees") or selecting a specific zone reference name (e.g., Chidorigafuchi).

(2) Each set of adjacent node information includes information indicating the offset to the corresponding attribute table in which attribute codes indicating the attribute of the link and the zone reference name are stored. Thus, information indicating the attribute, the zone reference name and the like can be attached to each link. This information can then be used to allow the user to specify a waypoint by indicating a specific attribute, e.g., "coastal road" or a specific zone reference name, e.g., "Shonan Beach" and, accordingly, a recommended route that passes through the waypoint desired by the user can be calculated.

(3) In the code correspondence table, zone reference names and the coordinates of the geographic points representing individual zone reference names are stored with the attribute codes for each attribute reference name. Thus, it is possible to display lists of zone reference names, such as that shown in FIG. 10, sorted in correspondence to individual attribute reference names, achieving a highly user friendly system.

(4) When displaying the lists of scenic byway road candidates at the display monitor 119, the attribute reference names and the zone reference names with coordinate values contained in a specific range determined in correspondence to the vehicle current position and the destination are extracted. As a result, only the zone reference names of zones related to the current position and the destination alone are displayed to achieve a highly efficient display of lists that do not include any superfluous information.

(5) Once a scenic byway road is set, the link cost of each link with the attribute code corresponding to the scenic byway road is lowered to raise the selectability of the link during the recommended route calculation. In other words, the link cost over the entire scenic byway road having been set is reduced so that the scenic byway road having been set can be readily selected in its entirety. As a result, the recommended route can be calculated so as to ensure that the recommended route passes through the entire scenic byway road having been set instead of only part of the scenic byway road having been set. The user is then provided with route guidance to the destination through the road satisfying the requirement set by the user. On the other hand, if no scenic byway road is set, the user is provided with route guidance similar to that achieved in a car navigation apparatus in the related art.

(6) When the recommended route is displayed, the scenic byway road having been set is displayed in a display mode different from the display mode of the rest of the recommended route. As a result, even a user who does not know the position of the scenic byway road having been set can easily ascertain the exact position of the scenic byway road simply by checking the display at the display monitor 119.

Second Embodiment

In reference to FIGS. 13 to 18, the second embodiment of the present invention is explained. In the second embodiment, the user making a selection from the scenic byway road candidates is allowed to simply select an attribute, e.g., a coastal road or a mountain road, in a list displayed at the display monitor. The structural difference of the on-vehicle apparatus in the second embodiment from that in the first embodiment is in the data structure adopted for the route search data. Accordingly, the following explanation focuses on the difference from the first embodiment.

Figure 13:
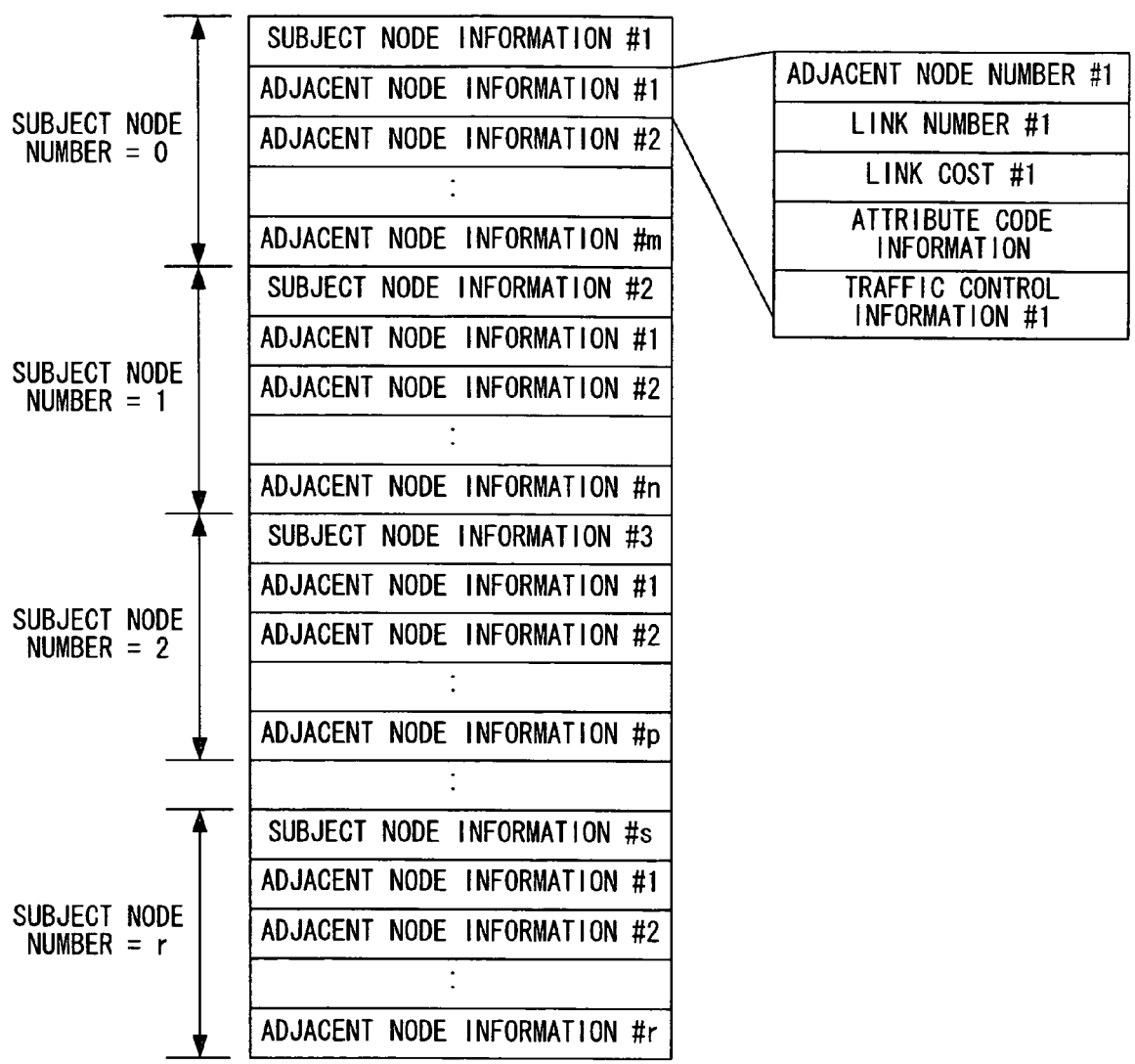
FIG. 13 shows the data structure of the route search data used in the second embodiment.

FIG. 13 shows the data structure of the route search data adopted in the second embodiment. The data structure differs from that of the route search data in the first embodiment shown in FIG. 3 in that "attribute code information" is stored in place of the "attribute table offset" stored in the adjacent node information.

Figures 14A, 14B:
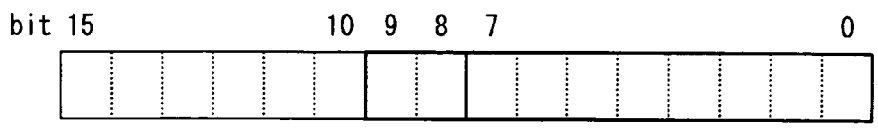
FIGS. 14A and 14B show the structure of the attribute code information used in the second embodiment

FIGS. 14A and 14B show the structure of attribute code information. A set of attribute code information that indicates a road attribute of the road connecting the subject node and an adjacent node at the subject node is constituted of 16 bits, as shown in FIG. 14A. Bits 15 to 10 are not used, and are reserved for future functional expansion. Bits 9 and 8 are used to indicate a specific simple attribute code. As shown in FIG. 14B, 0 is set for both bit 9 and bit 8 if the simple attribute code indicates an attribute related to a scenic view, e.g., a coastal road or a mountain road, whereas 0 is set for bit 9 and 1 is set for bit 8 to indicate an attribute related to a specific activity such as dining. It is to be noted that the combination of 1 set for bit 9 and 0 set for bit 8 is not currently in use, whereas 1 is set both for bit 9 and bit 8 to indicate an attribute that cannot be classified as either 00 (binary number) or 10 (binary number).

Bits 7 to 0 are used to indicate an attribute code, and an attribute code data portion is referenced in correspondence to the attribute code contents. Namely, if any of 01 (hexadecimal number) to FC (hexadecimal number) is set for bits 7 to 0, condition data in the attribute code data portion which correspond to the numerical value written in the attribute code are referenced. For instance, if bits 7 to 0 indicate 4 (hexadecimal number), condition data #4 in the attribute code data portion which correspond to the numerical value 4 (hexadecimal number) written in the attribute code are referenced (see FIG. 15A). In addition, as shown FIG. 4B, when bits 7 to 0 indicate 00 (hexadecimal number), the attribute code is an undetermined or unknown attribute, whereas when bits 7 to 0 indicate FD (hexadecimal number) to FF (hexadecimal number), the attribute code is an unused code.

FIGS. 15A to 15C explains the structure of the attribute code data portion mentioned above. The attribute code data portion is constituted of an attribute code data header and condition data #1 to #n that follow the attribute code data header. In the attribute code data header, the information indicating leading values of the attribute codes stored in the attribute code data portion and the information indicating the number of sets of condition data stored in the attribute code data portion are stored. As explained above, the condition data corresponding to the numerical value written in the attribute code of the attribute code information shown in FIG. 14 are referenced. Each set of condition data are constituted of 48 bits, as shown in FIG. 15B. The contents shown in FIG. 15C are allocated to the individual bits, and a specific road attribute is indicated depending upon whether 0 or 1 is set for each bit.

Route Search in the Second Embodiment

The route search calculation is executed by using the route search data described above in the on-vehicle apparatus achieved in the second embodiment. Flowcharts of the operation executed by the on-vehicle apparatus in the second embodiment will be similar to the flowcharts of the operation of the on-vehicle apparatus 100 achieved in the first embodiment, except for the flows of certain subroutines, and the following explanation focuses on the differences from the first embodiment.

Figure 16:
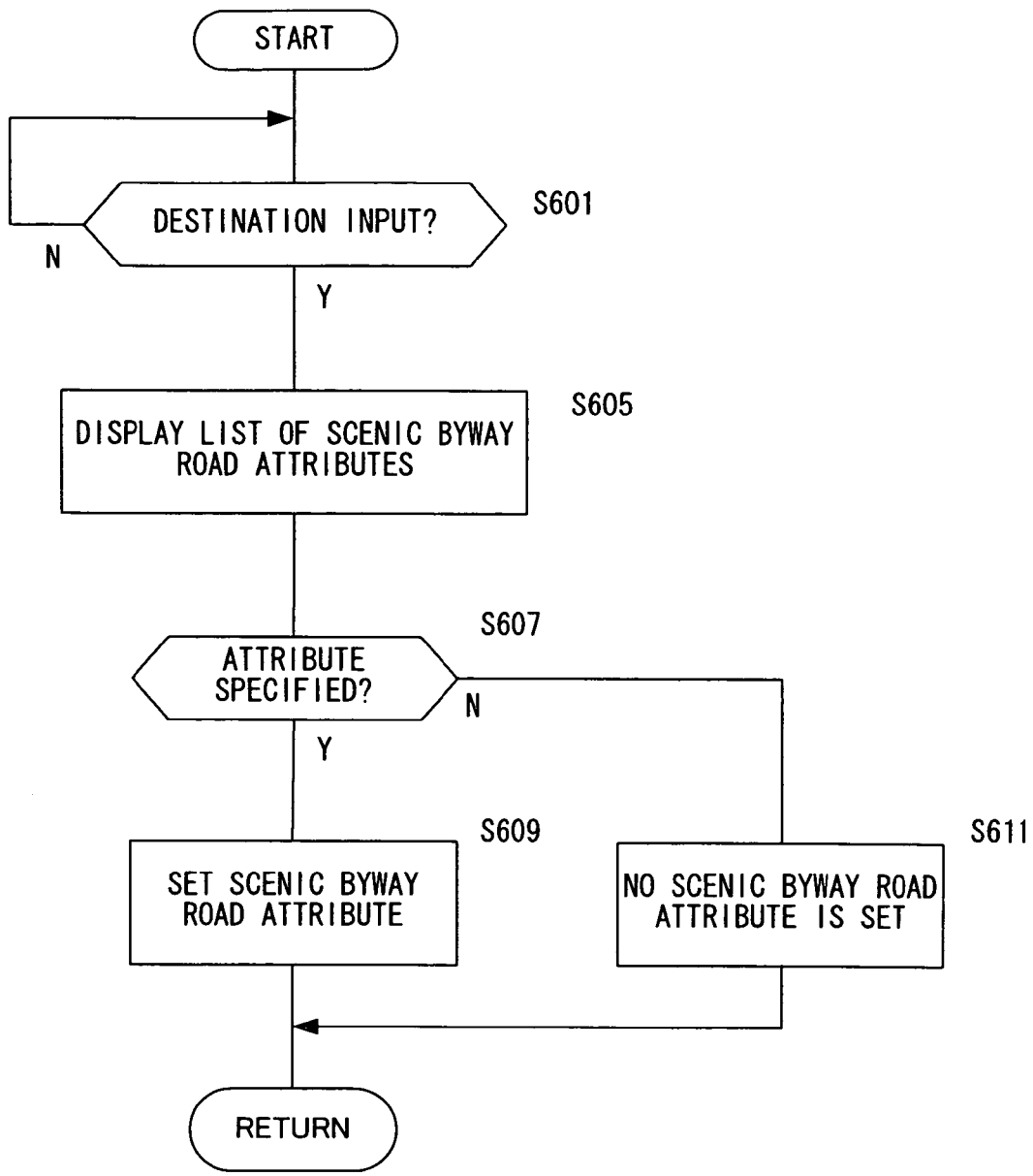
FIG. 16 shows a flowchart of part of the subroutine executed in step S13 in the second embodiment.
Figure 17:
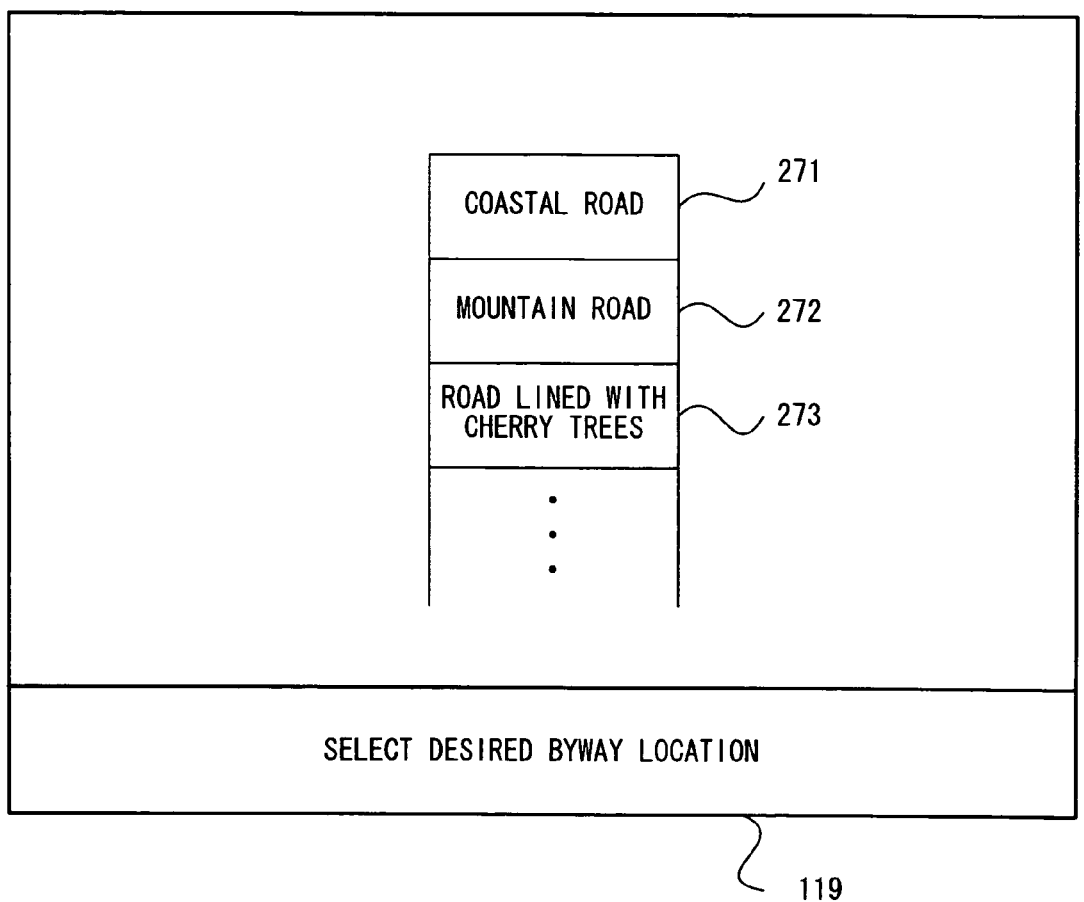
FIG. 17 shows attributes of scenic byway roads displayed at the display monitor 119

In the second embodiment, a list of scenic byway road attributes is displayed at the display monitor 119 to allow the driver to choose whether or not a recommended route is to be calculated so that the vehicle will travel on a road with a specific attribute, e.g., "a coastal road", "a mountain road" or "a road lined with cherry trees". FIG. 16 presents a flowchart of part of the subroutine executed in the second embodiment in step S13 shown in FIG. 6. In step S601, the operation waits in standby until a destination is entered. When the destination is input, the operation proceeds to step S605 to display scenic byway road attributes at the display monitor 119. The scenic byway road attributes are displayed as a list of various attributes 271 to 273, as shown in FIG. 17. Once the processing in step S605 is executed, the operation proceeds to step S607 to make a decision as to whether or not a scenic byway road attribute in the list displayed in S605 has been specified. It is to be noted that more than one scenic byway road attribute may have been specified before the decision is made in step S607. If an affirmative decision is made in step S607, the operation proceeds to step S609 to set the specified scenic byway road attribute, and then the subroutine ends. If, on the other hand, a negative decision is made in step S607, the operation proceeds to step S611 to end the subroutine without setting any scenic byway road attribute.

Figure 18:
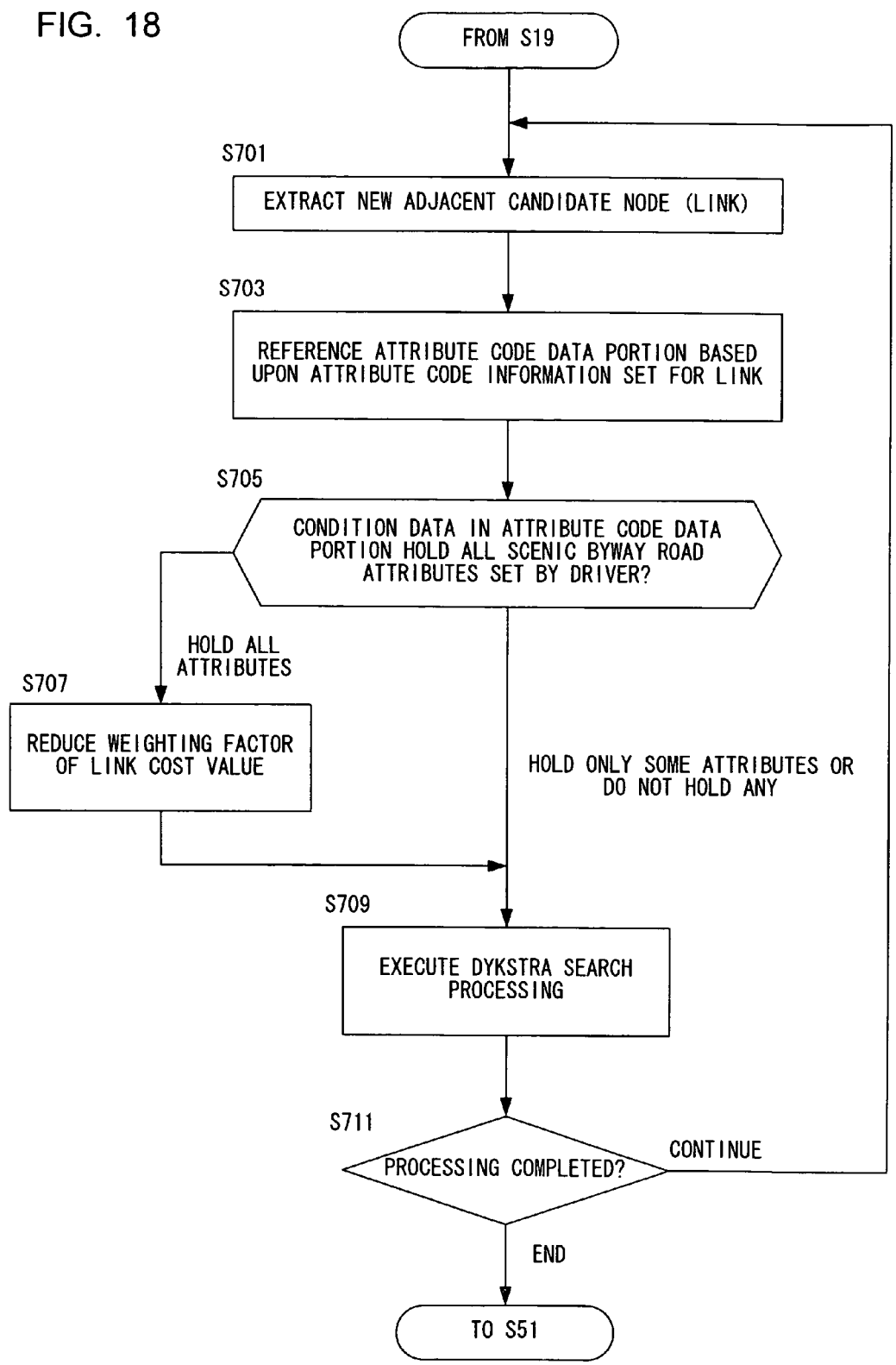
FIG. 18 shows a flowchart of the subroutine executed in step S20 in the second embodiment

FIG. 18 presents a flowchart of the subroutine executed in step S20 in the second embodiment. In step S701, a new adjacent candidate node is extracted. In this case, an adjacent candidate link, instead, maybe extracted. In step S703, the corresponding attribute code data portion shown in FIG. 14 is referenced based upon the attribute code information set for the node extracted in step S701. In step S705, a decision is made as to whether or not the condition data in the attribute code data portion referenced in step S703 hold scenic byway road attributes set by the driver. If an affirmative decision is made in step S705, the operation proceeds to step S707 to reduce the weighting factor of the link cost value of the link at a predetermined rate. Namely, the link cost value is reduced to raise the selectability of the link in the route search calculation. After executing the processing in step S707 or after making a negative decision in step S705, the operation proceeds to step S709. In step S709, a route search calculation is executed for the link by adopting a Dykstra method of the known art, and then the operation proceeds to step S711. In step S711, a decision is made as to whether or not the route search processing has been completed, i.e., whether or not the route obtained through the route search processing in step S709 has reached the destination. If an affirmative decision is made in step S711, the subroutine ends and the operation returns to step S51 in the main routine. If, on the other hand, a negative decision is made in step S711, the operation returns to step S701.

When the vehicle is currently located at Kasumigaseki in Chiyoda Ward, Tokyo and the destination set for the route search is Hakone Yumoto in Hakone, Kanagawa Prefecture, the on-vehicle apparatus achieved in the second embodiment provides route guidance as follows. As a given geographic point near Hakone Yumoto is entered to set the destination in step S13 in FIG. 6, a list of scenic byway road attributes such as that shown in FIG. 17 is displayed at the display monitor 119. The driver designates "coastal road" by operating the various operating switches at the input device 117 to set a scenic byway road attribute. Namely, bit 46, which indicates "coastal road" or "non-coastal road" in the attribute code data portion (see FIG. 15) is referenced in correspondence to the attribute code information (see FIGS. 13 and 14) stored in the adjacent node information of the adjacent candidate node during the route search calculation. In the route search calculation, the link cost value of the link to this candidate node is reduced if bit 46 indicates 1. In other words, if 1 is set for bit 46, the route search calculation is executed by lowering the link cost of the scenic byway road having the "coastal road" attribute. When the route search calculation executed as described above is completed, the recommended route 203, for instance, through which the vehicle is guided from Kasumigaseki through National Road No. 134 near Shonan Beach to Hakone Yumoto, as shown in FIG. 7, is brought up on display at the display monitor 119 and the route guidance starts.

The on-vehicle apparatus 100 in the second embodiment achieves the following advantage in addition to the advantages of the first embodiment.

(1) The details with regard to links are all stored in the corresponding condition data in the attribute code data portion. Thus, the information related to an existing link can be updated simply by changing the number of condition data stored in bits 7 to 0, and an easy information update is achieved.

EXAMPLES OF VARIATIONS

Figure 19:
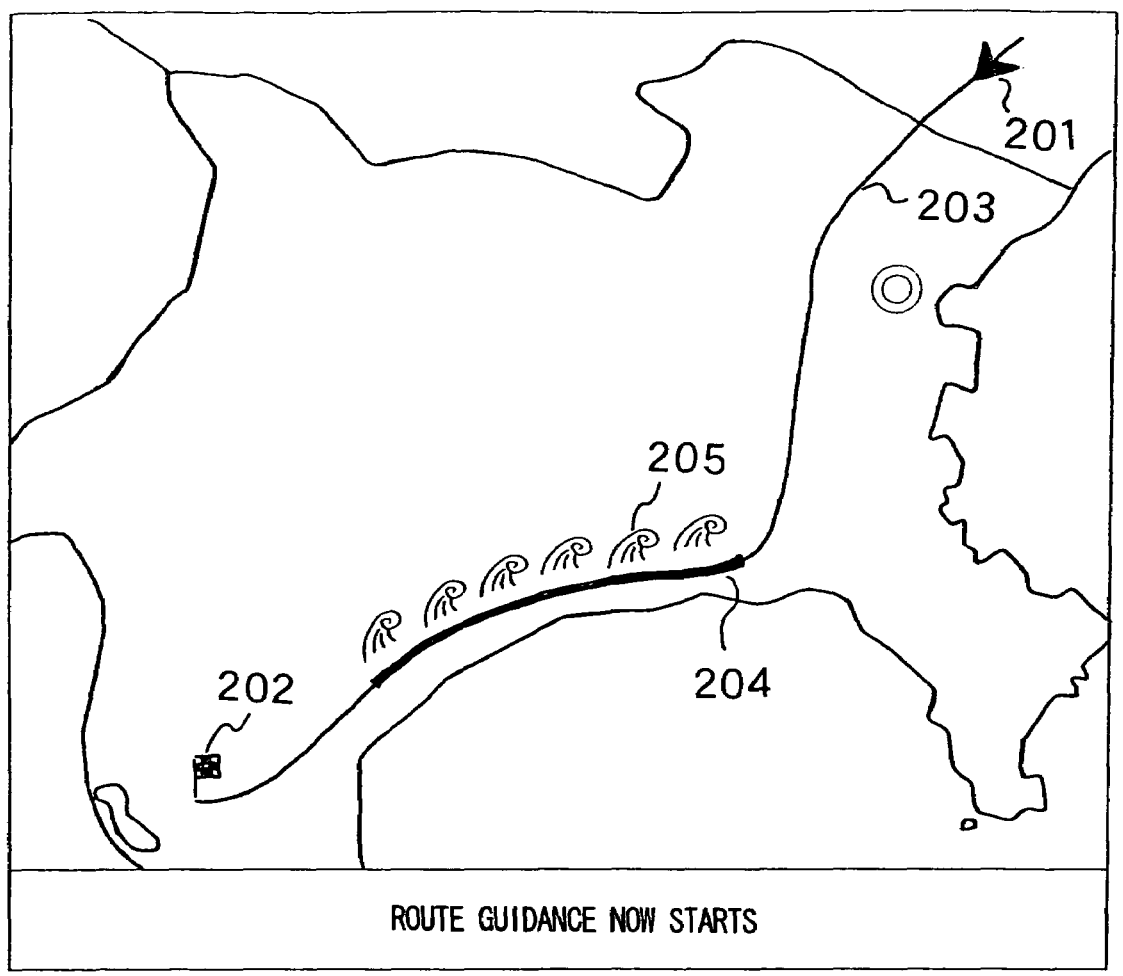
FIG. 19 shows an example of a variation of the recommended route display at the display monitor 119
Figure 20:
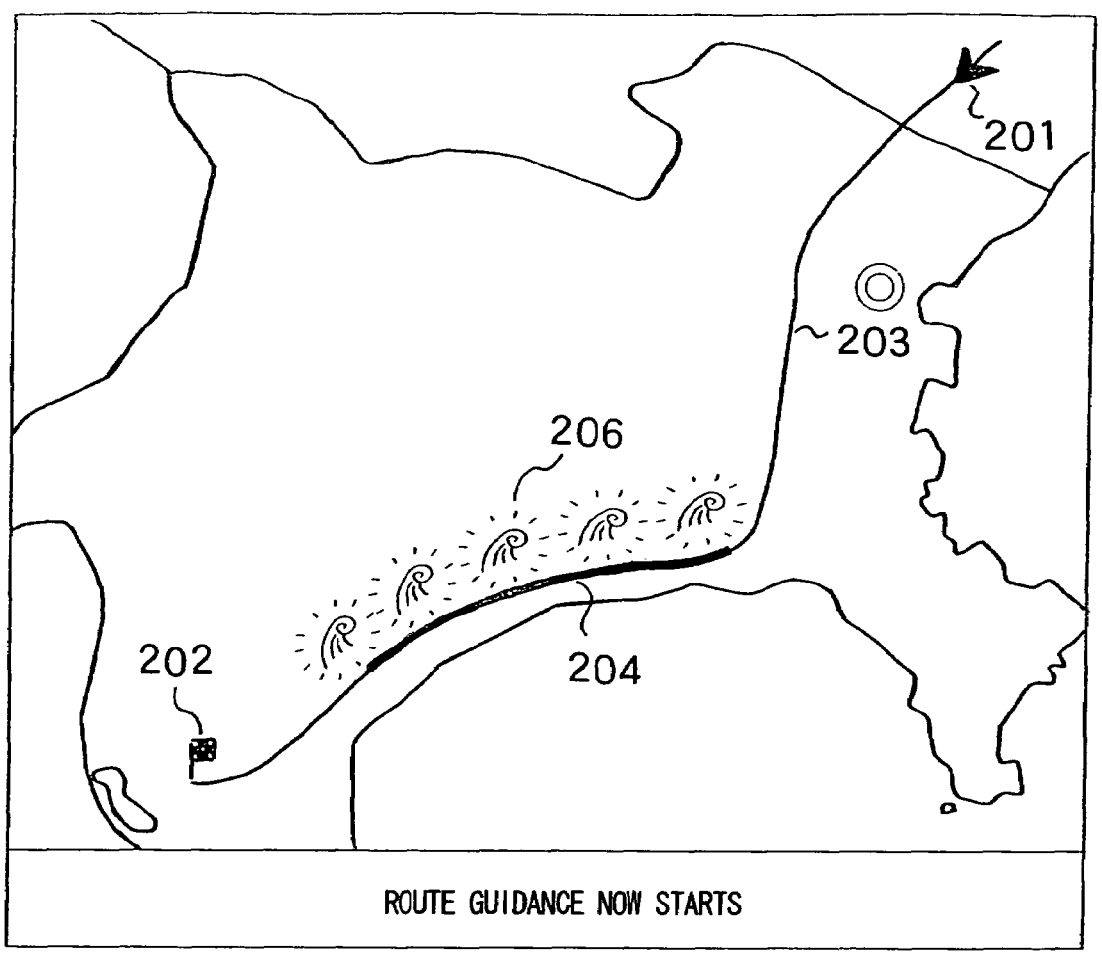
FIG. 20 shows an example of a variation of the recommended route display at the display monitor 119
Figure 21:
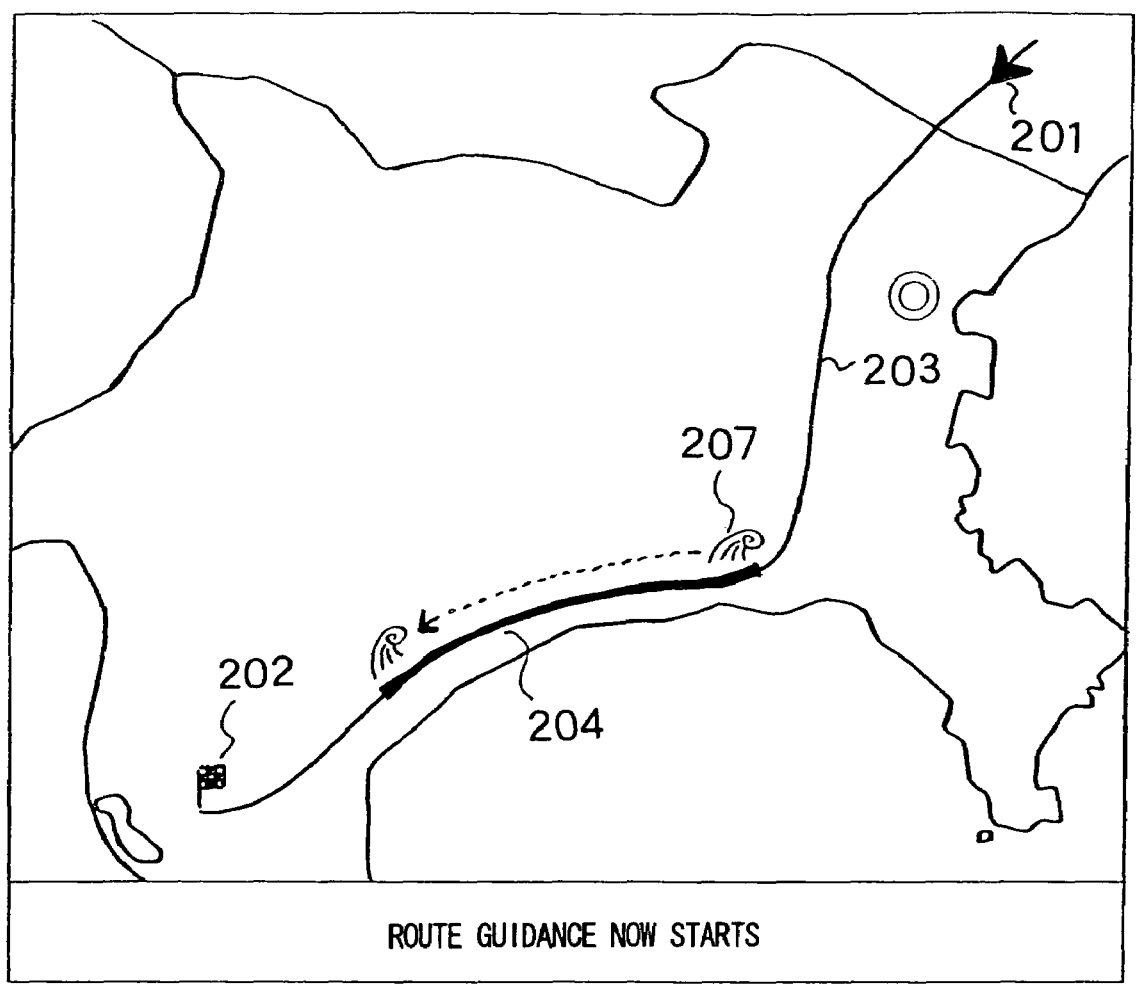
FIG. 21 shows an example of a variation of the recommended route display at the display monitor 119.

While the scenic byway road 204 displayed together with the recommended route 203 is indicated with a display color different from the display color used for the display of the rest of the recommended route 203 and with a bolder line for emphasis, as shown in FIG. 7, in the explanation given above, the present invention is not limited to this example. Instead, an icon representing the attribute of a scenic byway road, e.g., a wave icon 205 indicating the "coastal road" attribute shown in FIG. 19 or a cherry blossom icon indicating the "road lined with cherry trees" attribute may be displayed along the scenic byway road instead. In addition, such an icon 206 may flash, as shown in FIG. 20, or an icon 207 that moves along the direction in which the vehicle advances, as shown in FIG. 21, may be used. Furthermore, the icon display mode may be varied in correspondence to the attributes indicated by the individual icons, e.g., the wave icons 205 to 207 animated to imitate a wave motion and the blossom icon made to rotate. Also, during the route guidance, as the vehicle reaches the vicinity of the scenic byway road set in step S13, a message indicating that the vehicle is now approaching the scenic byway road having been set may be brought up on display or an audio message informing that the vehicle is now approaching the scenic byway road may be output.

While the area 804 ranging along opposite directions from the straight line 803 connecting the current position 801 and the destination 802 so as to achieve a predetermined width W, as shown in FIG. 9, is selected as an area from which scenic byway road candidates are to be extracted in the first embodiment described above, the present invention is not limited to this example. For instance, the width W may be varied as appropriate in correspondence to the distance between the current position and the destination. In addition, while the area 804 selected as described above is rectangular in shape, the area 804 may instead assume an elliptic shape converging at the current position and the destination. Moreover, the area 804 may be expanded to range over any prefecture contained in the original area 804.

While an explanation is given above on an example in which a road with a good scenic view is set as a byway road, the present invention is not limited to this example. For instance, the byway road attributes may include "road passing through an area with numerous restaurants" and "road passing by a shopping mall". In addition, after executing step S105 in FIG. 8 in the first embodiment, a map of an area around the geographic point representing the scenic byway road desired by the driver in the displayed lists may be brought upon display. For instance, if Shonan Beach is selected from the scenic byway road lists displayed as shown in FIG. 10, the code correspondence table shown in FIG. 5 may be referenced to display the position of the road around Shonan Beach at the display monitor 119 based upon the coordinates of the geographic point representing the Shonan Beach area. Furthermore, the individual embodiments and the examples of variations explained above may be adopted in various combinations.

The present invention is not limited to the specific apparatus structures adopted in the embodiments explained above in any way whatsoever, as long as the functions characterizing the present invention are not compromised.

(Effect of the Invention)

In the on-vehicle apparatus 100 according to the present invention, if attribute data having been input match the attribute data of a link extracted in the recommended route calculation executed to ascertain a recommended route from the start point to the destination, the route is calculated by executing the processing so that the selectability of the link as the recommended route is increased. This ensures that the entire road matching the attribute data is calculated as the recommended route instead of part of the road matching the input attribute data and, as a result, the route guidance is provided so as to guide the vehicle to the destination through the road satisfying the specific requirements of the user.

In addition, when the recommended route is displayed at the means for display, the road matching the attribute data having been input is displayed in a display mode different from the display mode adopted to display the rest of the recommended route. Thus, even when the user does not know the position of the road matching the input attribute data, the user can easily ascertain the exact position of the road simply by checking the means for display.

It is to be noted that, while an explanation is given above in reference to the embodiments on an example in which the control program executed by the control circuit 114 of the on-vehicle apparatus 100 is stored in the ROM 116, the present invention is not limited to this example. The control program and the installation program used to install the control program may be provided in a recording medium such as the DVD-ROM 113.

Moreover, these programs may be provided via a transmission medium such as a communication line, a typical example of which is the Internet. Namely, the programs may be converted to and transmitted as signals on a carrier wave that carries a transmission medium. Thus, the program can be distributed as a computer-readable computer program product adopting any of various modes including a recording medium and a carrier wave.

It is to be noted that a car navigation apparatus may be achieved by executing the control program described above on a personal computer. In addition, the present invention may be adopted to achieve a navigation function by utilizing a portable phone (cellular phone) or a PDA (personal digital assistant).

What is claimed is:

1. A recommended route calculation method for calculating a recommended route from a current position to a destination, comprising:
    displaying a list of roads sorted based upon an attribute of road;
    identifying a road specified by a user among the displayed roads;
    setting a predetermined point of the identified road as a waypoint; and
    calculating the recommended route from the current position to the destination via the set waypoint.

2. A recommended route calculation method for calculating a recommended route from a current position to a destination, comprising:
    displaying a list of roads sorted based upon an attribute of road;
    identifying a road specified by a user among the displayed roads; and
    processing so that selectability of a road, an attribute of which matches an attribute of the identified road, is raised when calculating the recommended route from the current position to the destination.

3. A recommended route calculation method for calculating a recommended route from a current position to a destination based upon map data constituted of nodes and links comprising steps of:

extracting attribute data of a link from data related to the links, the attribute data indicating characteristics of the link;

judging whether or not the extracted attribute data of the link match attribute data having been input;

processing so that selectability of the link as a part of the recommended route is raised, when judging that the extracted attribute data of the link match the attribute data having been input;

selecting a range determined in correspondence to the start point and the destination;

determining links contained in the range;

extracting attribute data included in the determined links; and bringing up a display of the extracted attribute data included in the determined links at a display device, wherein the attribute data having been input is attribute data having been input based upon the display.

4. A recommended route calculation method according to claim 3, wherein:

the extracted attribute data to be displayed at the display device are sorted in correspondence to the characteristics of each of the determined links.

5. A recommended route calculation method for calculating a recommended route from a current position to a destination based upon map data constituted of nodes and links, comprising steps of:

extracting attribute data of a link from data related to the links, the attribute data indicating characteristics of the link;

judging whether or not the extracted attribute data of the link match attribute data having been input;

processing so that selectability of the links as a part of the recommended route is raised, when judging that the extracted attribute data of the link match the attribute data having been input; and displaying the calculated recommended route, wherein:

when displaying the calculated recommended route, a part of the recommended route corresponding to the link with the attribute data matching the input attribute data is displayed in a display mode different from a display mode adopted to display the rest of the recommended route.

6. A recommended route calculation method according to claim 5, wherein:

when displaying the calculated recommended route at the display device, the part of the recommended route corresponding to the link with the attribute data matching the input attribute data is displayed together with a mark indicating the meaning of the input attribute data.

7. A recommended route calculation method according to claim 6, wherein:

the mark is an icon adopting a display mode corresponding to a type of attribute data.

8. A navigation apparatus, comprising:

a control device executing a recommended route calculation method according to claim 1.

9. A navigation apparatus, comprising:

a control device executing a recommended route calculation method according to claim 2.

* * * * *